US012742348B2

(12) United States Patent
Pavnick et al.

(10) Patent No.: US 12,742,348 B2
(45) Date of Patent: Sep. 22, 2026

(54) HINGE BRACKET ASSEMBLY FOR AN APPLIANCE CABINET

(71) Applicant: WHIRLPOOL CORPORATION, Benton Harbor, MI (US)

(72) Inventors: Ian Pavnick, Michigan City, IN (US); Ryan M. Post, Coloma, MI (US); Michael S. Richards, St. Joseph, MI (US); Chad J. Rotter, Saugatuck, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 19/198,373

(22) Filed: May 5, 2025

(65) Prior Publication Data

US 2025/0327348 A1 Oct. 23, 2025

Related U.S. Application Data

(60) Continuation of application No. 18/639,095, filed on Apr. 18, 2024, now Pat. No. 12,320,176, which is a
(Continued)

(51) Int. Cl.
*F25D 23/02* (2006.01)
*B21D 53/40* (2006.01)
(Continued)

(52) U.S. Cl.
CPC ............ *E05D 5/065* (2013.01); *B21D 53/40* (2013.01); *E05D 7/081* (2013.01); *E05D 7/12* (2013.01);
(Continued)

(58) Field of Classification Search
CPC ...... E05D 11/06; E05D 7/12; F25D 2323/024
See application file for complete search history.

(56) References Cited

U.S. PATENT DOCUMENTS 1,909,654 A * 5/1933 Brown ................. B65D 5/6647
24/581.1
2,555,291 A 5/1951 Jules
(Continued)

FOREIGN PATENT DOCUMENTS

CN 201421232 Y 3/2010
GB 2330174 A * 4/1999 ............... E05D 7/12
(Continued)

*Primary Examiner* — Emily M Morgan
(74) *Attorney, Agent, or Firm* — Price Heneveld LLP

(57) ABSTRACT

A hinge bracket assembly includes an appliance wrapper defining a first receiving space extending in a first direction, a second receiving space extending in a second direction substantially perpendicular to the first direction, and a third receiving space extending in a third direction oriented at an acute angle relative to the first direction. An anchor plate is engaged with the appliance wrapper and includes a retention member received by the first receiving space, a first flange received by the second receiving space, and a second flange received by the third receiving space. A hinge plate is coupled with the anchor plate and includes a protrusion received by a slot defined by the retention member. The appliance wrapper is positioned between the anchor and hinge plates. A locking arm is selectively engaged with the anchor and hinge plates and is rotatable between an unlocked position and a locked position.

15 Claims, 21 Drawing Sheets

Related U.S. Application Data division of application No. 17/095,144, filed on Nov. 11, 2020, now Pat. No. 11,970,895, which is a continuation-in-part of application No. 16/418,308, filed on May 21, 2019, now Pat. No. 11,072,956.

(51) Int. Cl.

| | |
|---|---|
| ***E05D 5/06*** | (2006.01) |
| ***E05D 7/081*** | (2006.01) |
| ***E05D 7/12*** | (2006.01) |
| ***E05D 11/06*** | (2006.01) |

(52) U.S. Cl.

CPC .............. *E05D 11/06* (2013.01); *E05D 7/123* (2013.01); *E05Y 2600/626* (2013.01); *E05Y 2900/132* (2013.01); *E05Y 2900/31* (2013.01); *Y10T 29/24* (2015.01); *Y10T 29/4995* (2015.01)

(56) References Cited

U.S. PATENT DOCUMENTS

| | | | | | |
|---|---|---|---|---|---|
| 3,869,753 | A | | 3/1975 | Boback | |
| 5,870,801 | A | | 2/1999 | Kim | |
| 5,884,366 | A | | 3/1999 | Jeong | |
| 5,960,518 | A | | 10/1999 | Jeong | |
| 6,070,300 | A | * | 6/2000 | Shin | E05D 7/1044 16/382 |
| 6,085,385 | A | | 7/2000 | Joo | |
| 8,245,352 | B2 | | 8/2012 | Park | |
| 8,506,026 | B2 | * | 8/2013 | Kim | F25D 23/028 312/405 |
| 9,170,045 | B2 | | 10/2015 | Oh et al. | |
| 9,383,135 | B2 | | 7/2016 | Park et al. | |
| 9,885,514 | B2 | | 2/2018 | Giacomini et al. | |
| 10,415,284 | B2 | | 9/2019 | Kim | |
| 10,480,228 | B2 | * | 11/2019 | Kim | E05D 7/0415 |
| 11,072,956 | B2 | | 7/2021 | Pavnick et al. | |
| 2004/0237257 | A1 | * | 12/2004 | Pohl | F25D 23/028 16/221 |
| 2009/0289536 | A1 | | 11/2009 | Park et al. | |
| 2010/0026155 | A1 | | 2/2010 | Yun | |
| 2010/0033067 | A1 | * | 2/2010 | Kim | E05D 7/0423 16/221 |
| 2012/0037642 | A1 | * | 2/2012 | Sun | F25D 23/028 220/592.02 |
| 2012/0038259 | A1 | * | 2/2012 | Lee | F25D 23/028 312/405 |
| 2018/0156531 | A1 | * | 6/2018 | Heisswolf | E05D 7/0415 |
| 2018/0298657 | A1 | | 10/2018 | Kim | |

FOREIGN PATENT DOCUMENTS

| | | | |
|---|---|---|---|
| KR | 19980072590 | A | 11/1998 |
| KR | 19990020007 | U | 6/1999 |
| KR | 200165712 | Y1 | 1/2000 |
| KR | 20000000706 | U | 1/2000 |
| KR | 200169565 | Y1 | 2/2000 |
| KR | 200185716 | Y1 | 7/2000 |
| KR | 200267218 | Y1 | 3/2002 |
| KR | 200281196 | Y1 | 7/2002 |

* cited by examiner

HINGE BRACKET ASSEMBLY FOR AN APPLIANCE CABINET

CROSS-REFERENCE TO RELATED APPLICATION

This application is a continuation of U.S. patent application Ser. No. 18/639,095, filed Apr. 18, 2024, now U.S. Pat. No. 12,320,176, entitled "HINGE BRACKET ASSEMBLY," which is a division of U.S. patent application Ser. No. 17/095,144, filed on Nov. 11, 2020, now U.S. Pat. No. 11,970,895, entitled "HINGE BRACKET ASSEMBLY," which is a continuation-in-part of U.S. patent application Ser. No. 16/418,308, filed on May 21, 2019, now U.S. Pat. No. 11,072,956, entitled "HINGE BRACKET," the disclosures of which are hereby incorporated herein by reference in their entirety.

BACKGROUND OF THE DISCLOSURE

The present disclosure generally relates to a hinge bracket assembly, and more specifically, to a hinge bracket for an appliance door.

SUMMARY OF THE DISCLOSURE

According to one aspect of the present disclosure, a hinge bracket assembly includes a hinge bracket assembly includes an appliance wrapper defining a first receiving space extending in a first direction, a second receiving space extending in a second direction substantially perpendicular to the first direction, and a third receiving space extending in a third direction oriented at an acute angle relative to the first direction. An anchor plate is engaged with the appliance wrapper and includes a retention member received by the first receiving space, a first flange received by the second receiving space, and a second flange received by the third receiving space. A hinge plate is coupled with the anchor plate and includes a protrusion received by a slot defined by the retention member. The appliance wrapper is positioned between the anchor and hinge plates. A locking arm is selectively engaged with the anchor and hinge plates and is rotatable between an unlocked position and a locked position.

According to another aspect of the present disclosure, a method of manufacturing an appliance includes a step of defining first, second, and third receiving spaces within a top wall of an appliance wrapper. The method further includes steps of positioning a retention member of an anchor plate within the first receiving space, positioning a first flange of the anchor plate within the second receiving space, and positioning a second flange of the anchor plate within the third receiving space. Another step includes inserting a fastener through an aperture defined by the top wall and through a through-hole defined by the anchor plate. The method further includes steps of coupling an insulation material with the wrapper to at least partially cover the anchor plate and removing the fastener from at least one of the aperture and the through-hole. Another step includes adjusting the anchor plate so that the anchor plate is free to float between the insulation material and the top wall of the wrapper as allowed by the first, second, and third receiving spaces. The method also includes a step of adjusting the anchor plate in one of first, second, and third directions to reach a design position, wherein the second direction is substantially perpendicular to the first direction and the third direction is oriented diagonally relative to each of the first and second directions. Another step includes reinserting the fastener to couple the anchor plate in the design position.

According to yet another aspect of the present disclosure, a method of manufacturing an appliance includes steps of defining at least one receiving space within a top wall of an appliance wrapper and engaging a flange of the anchor plate with the at least one receiving space. Another step includes coupling a hinge plate with the anchor plate. The method also includes adjusting the anchor plate within the at least one receiving space until the hinge plate aligns a door with an appliance cabinet. Other steps of the method include inserting the locking arm through a first aperture defined by the anchor plate, inserting the locking arm through a second aperture defined by the hinge plate, and inserting the locking arm through a third aperture defined by the top wall of the wrapper. Another step includes coupling the locking arm with the anchor plate and the hinge plate, wherein the locking arm couples the hinge plate with the anchor plate.

These and other features, advantages, and objects of the present disclosure will be further understood and appreciated by those skilled in the art by reference to the following specification, claims, and appended drawings.

Figure 1A:
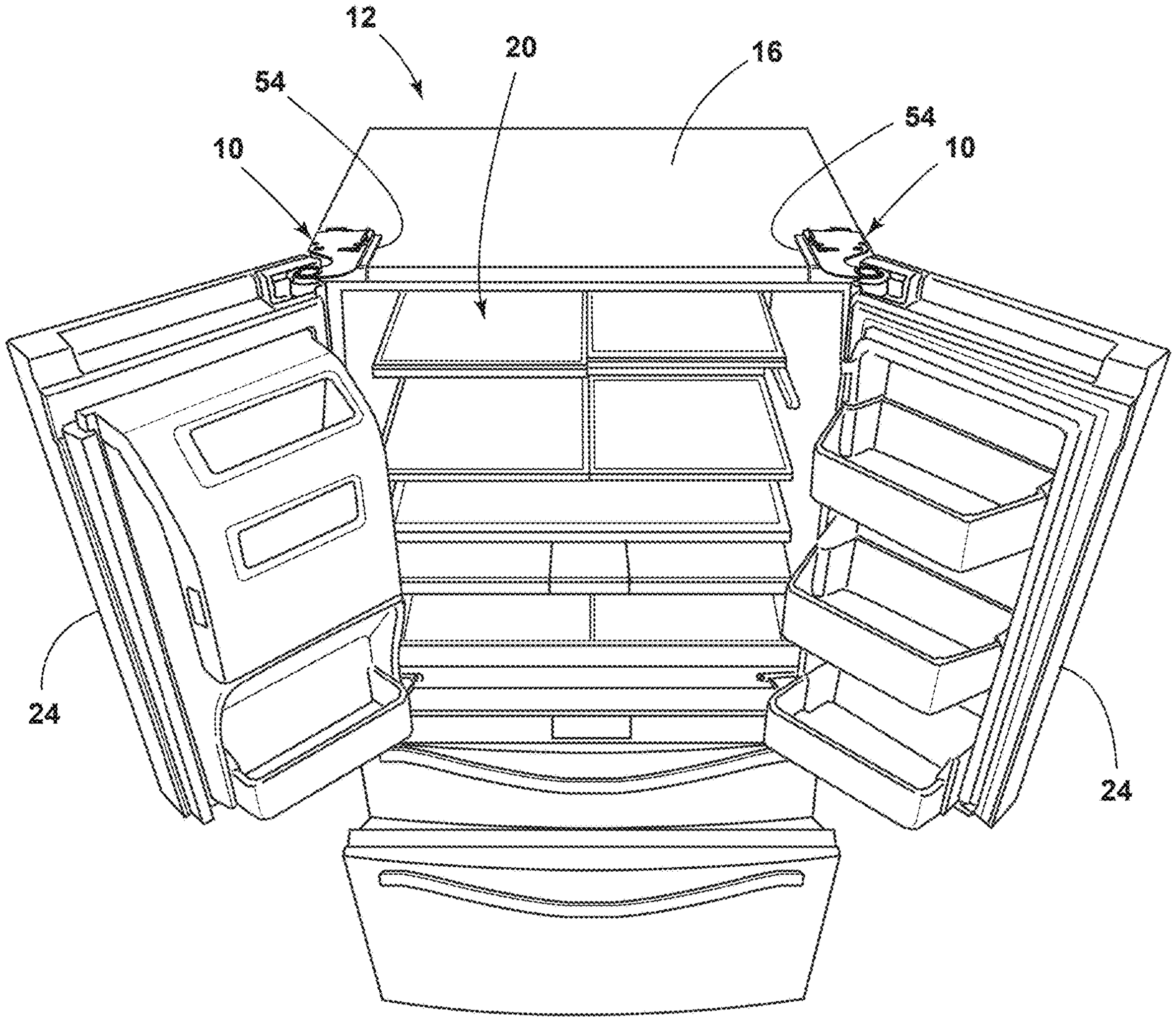
FIG. 1A is a top perspective view of an appliance including a hinge bracket assembly, according to various examples.

The components in the figures are not necessarily to scale, emphasis instead being placed upon illustrating the principles described herein.

DETAILED DESCRIPTION

The present illustrated embodiments reside primarily in combinations of method steps and apparatus components related to a hinge bracket. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms “upper,” “lower,” “right,” “left,” “rear,” “front,” “vertical,” “horizontal,” and derivatives thereof shall relate to the disclosure as oriented in FIG. 1A. Unless stated otherwise, the term “front” shall refer to the surface of the element closer to an intended viewer, and the term “rear” shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises a . . . ” does not, without more constraints, preclude the existence of additional identical elements in the process, method, article, or apparatus that comprises the element.

Referring to FIGS. 1A-19B, reference numeral 10 generally designates a hinge bracket assembly. The hinge bracket assembly 10 may include an anchor plate 14. A retention member 18 may extend perpendicularly from the anchor plate 14. The anchor plate 14 may define a first receiving aperture 22. A hinge plate 26 is aligned with the anchor plate 14. The hinge plate 26 may include a hinge arm 30 and a protrusion 34. The protrusion 34 may extend from an edge 38 of the hinge plate 26 opposite the hinge arm 30. The hinge plate 26 may define a second receiving aperture 42 aligned with the first receiving aperture 22 when the protrusion 34 is received by a slot 46 defined by the retention member 18. A locking arm 50 may be rotatable between an unlocked position and a locked position. The locking arm 50 may be configured to be at least partially received by the first and second receiving apertures 22, 42 to securely couple the hinge plate 26 with the anchor plate 14.

Figure 1B:
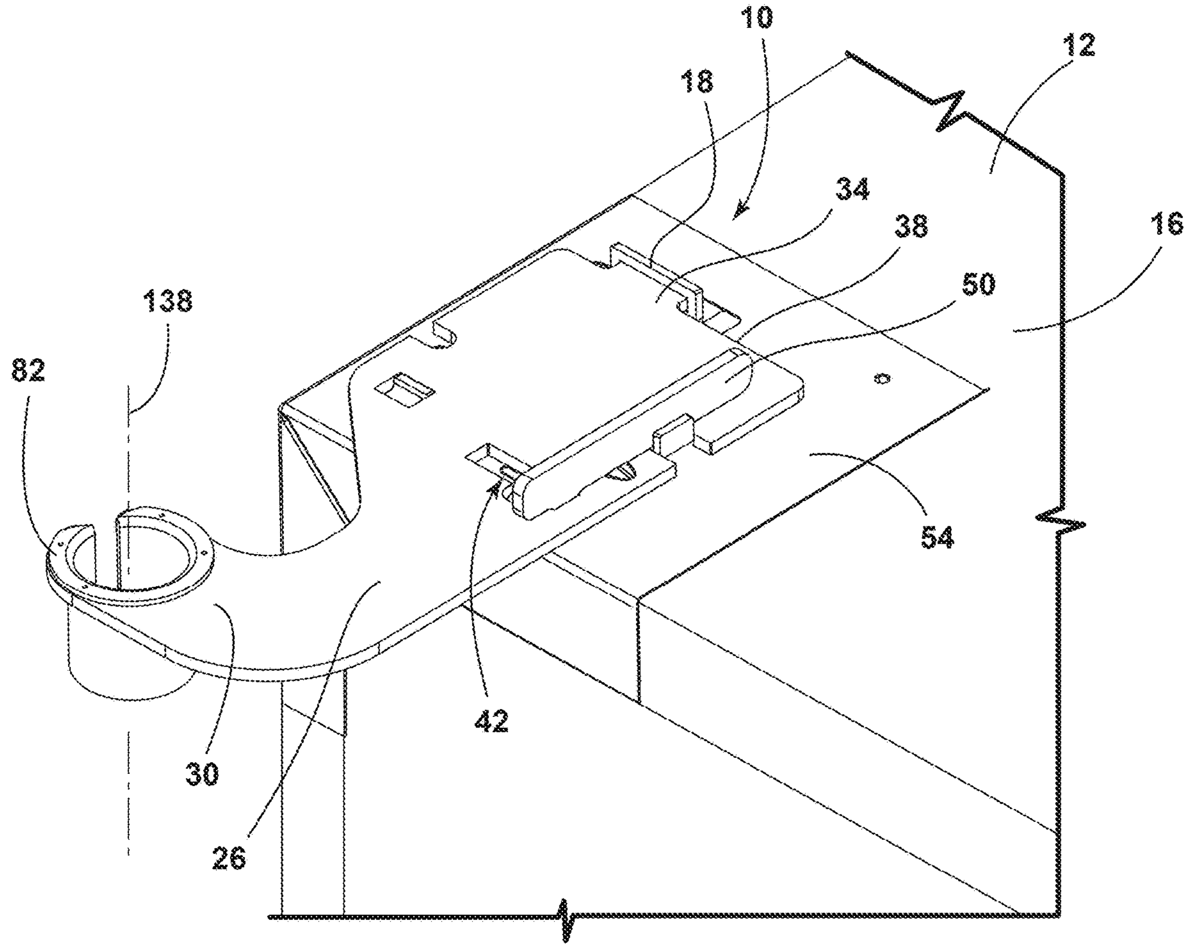
FIG. 1B is a side perspective view of the hinge bracket assembly coupled with the appliance of FIG. 1A.

Referring now to FIGS. 1A and 1B, an appliance 12 is shown including a cabinet 16 defining a compartment 20. The compartment 20 may be configured as a fresh food compartment, a freezer compartment, or any other desired compartment known in the art. A door 24 is configured to seal the compartment 20 and is operable between open and closed positions. The hinge bracket assembly 10 may be coupled with the appliance 12 proximate a corner of the cabinet 16. The door 24 may be rotatably coupled with the hinge bracket assembly 10.

Figure 2:
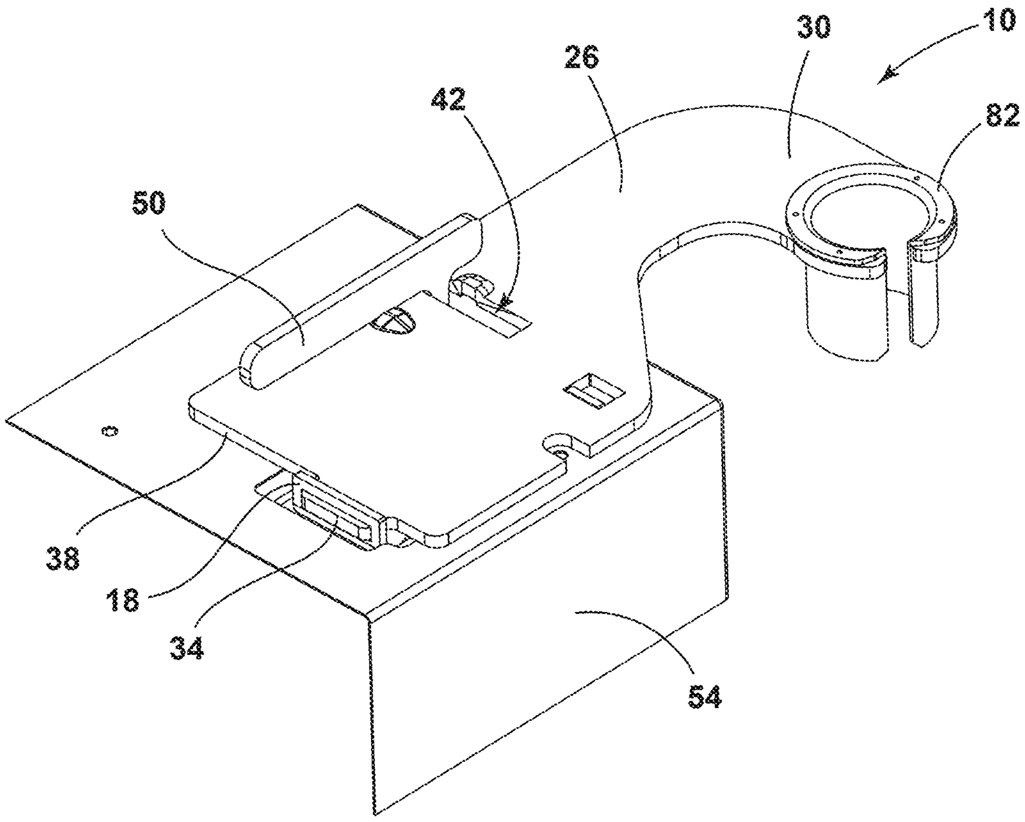
FIG. 2 is a side perspective view of a hinge bracket assembly, according to various examples.
Figure 3:
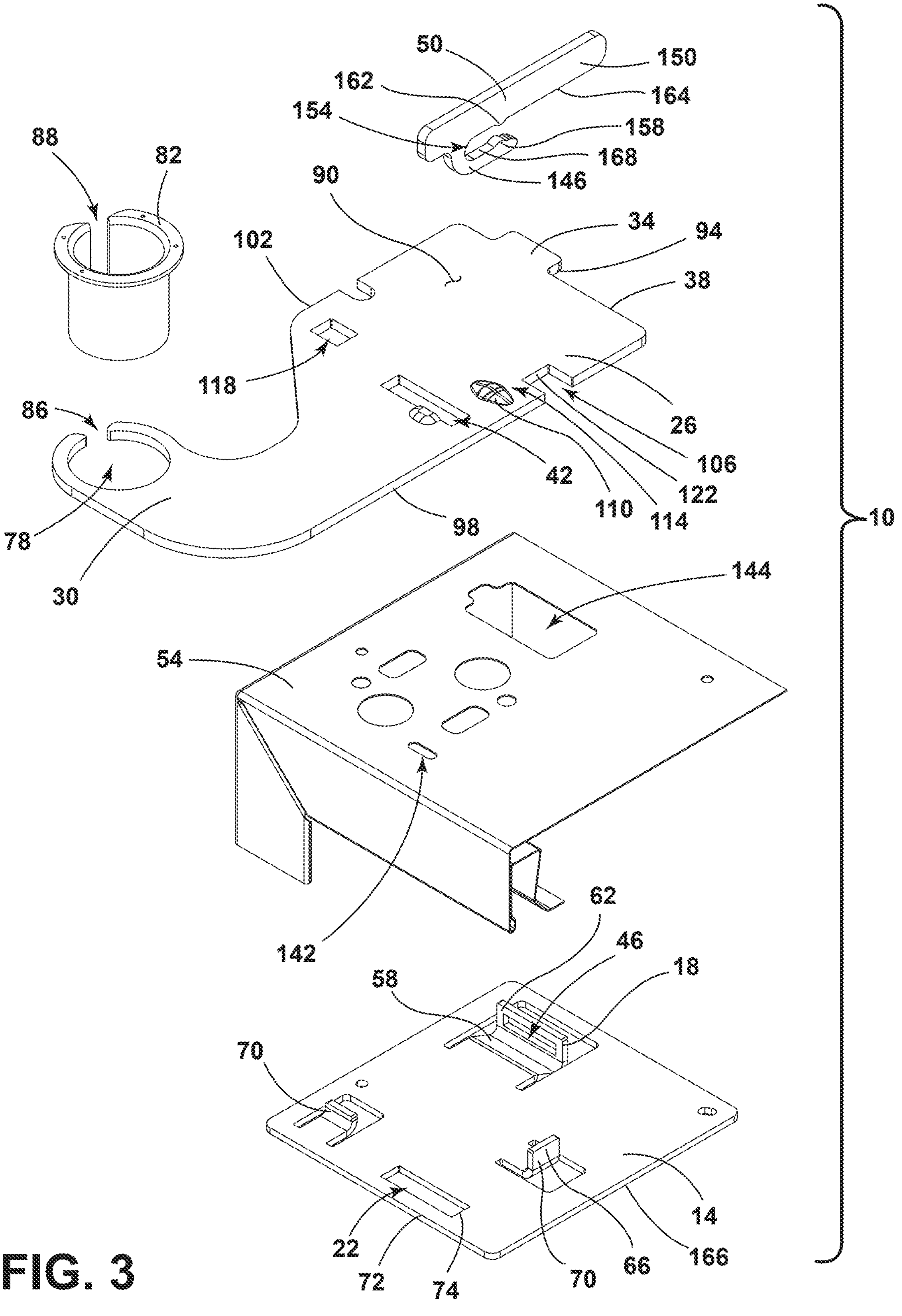
FIG. 3 is an exploded view of the hinge bracket assembly of FIG. 2.
Figure 4:
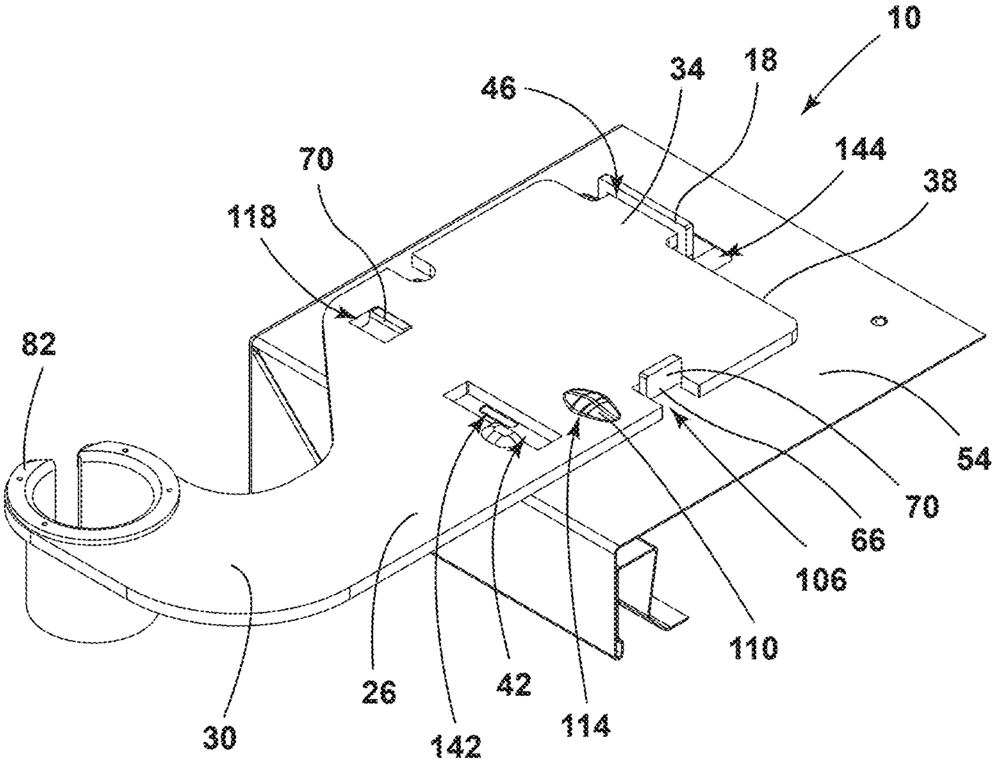
FIG. 4 is a side perspective view of a hinge plate coupled with a wrapper portion and an anchor plate, according to various examples.

Referring now to FIGS. 1B and 2, the hinge bracket assembly 10 is illustrated as including the anchor plate 14 coupled with the hinge plate 26. A corner member 54 is positioned between the anchor plate 14 and the hinge plate 26. The corner member 54 may be integrally formed with an appliance wrapper of the cabinet 16. Alternatively, the corner member 54 may be coupled with the cabinet 16. The locking arm 50 is positioned to couple the anchor plate 14 with the hinge plate 26. The locking arm 50 may further be configured to couple the corner member 54 between the anchor plate 14 and the hinge plate 26. The locking arm 50 may be rotatable between an unlocked position and a locked position.

Referring now to FIGS. 1B-3, the anchor plate 14 may be generally square, as illustrated. Alternatively, the anchor plate 14 may be rectangular or any other shape without departing from the scope of the present disclosure. As introduced above, the anchor plate 14 may include the retention member 18. The retention member 18 may extend perpendicularly from the anchor plate 14. In various examples, the retention member 18 may be continuously and integrally formed with the anchor plate 14. In other examples, the retention member 18 may be cut from the anchor plate 14 or may be punched through the anchor plate 14 such that the retention member 18 is spaced apart from the anchor plate 14 on at least one side of the retention member 18.

The retention member 18 may include a body portion 58 oriented to be at least partially co-planar with the anchor plate 14 and an arm 62 extending perpendicularly from the body portion 58. The body portion 58 may be substantially linear or may include an arcuate portion to provide for a deflection of the retention member 18 in a direction perpendicular to the anchor plate 14.

The arm 62 of the retention member 18 may define the slot 46 configured to receive the protrusion 34 of the hinge plate 26, as discussed above. The slot 46 may be substantially rectangular, square, or any other shape including linear edges. The slot 46 may extend the width of the arm 62 or may extend only partially across the arm 62. The slot 46 may be sized to receive the protrusion 34 of the hinge plate 26, as discussed in more detail elsewhere herein. The slot 46 may be defined by the arm 62 of the retention member 18 such that the arm 62 secures the protrusion 34 against vertical displacement with little or no deflection.

The anchor plate 14 may further include a stop 66 extending upward from the anchor plate 14. The stop 66 may be one of a plurality of flanges 70 extending substantially perpendicularly from the anchor plate 14. Each of the plurality of flanges 70 may be the same height as the other flanges 70. Alternatively, the stop 66 may extend a greater distance from the anchor plate 14 than the other flanges 70. In some examples, the flanges 70 may be sized such that the top surface of the flange 70 is substantially co-planar with an upper surface 90 of the hinge plate 26. In still other examples, each of the plurality of flanges 70 may extend a unique distance from the anchor plate 14. In still other examples, one or more the plurality of flanges 70 may be substantially the same size. The spacing of the plurality of flanges 70 may be determined by the shape and size of the hinge plate 26, as discussed elsewhere herein.

Each of the plurality of flanges 70 may extend outward from the anchor plate 14 in a direction parallel to the retention member 18. In various examples, the plurality of flanges 70, including the stop 66, may be integrally formed with the anchor plate 14. In other examples, each of the plurality of flanges 70 may be cut from the anchor plate 14 or may be punched through the anchor plate 14 such that the respective flange 70 is spaced apart from the anchor plate 14.

The anchor plate 14 may further define the first receiving aperture 22. The first receiving aperture 22 may be defined proximate a front edge 72 of the anchor plate 14. The first receiving aperture 22 may have a generally rectangular shape and may be sized to at least partially receive the locking arm 50. Elongated edges of the first receiving aperture 22 may be generally parallel with the front edge 72 of the anchor plate 14. The first receiving aperture 22 may further be positioned proximate the stop 66 such that an edge 74 of the first receiving aperture 22 is substantially aligned with the stop 66.

Referring still to FIGS. 1B-4, the hinge plate 26 may be aligned with the anchor plate 14. The hinge plate 26 may include the hinge arm 30 extending from a first side of the hinge plate 26. The hinge arm 30 may be at least partially arcuate such that the hinge arm 30 forms a hook-shape. The hinge arm 30 may define a receiving well 78 at a terminal end of the hook-shaped hinge arm 30. The receiving well 78 may be generally circular and may be in communication with a gap 86. The receiving well 78 may be configured to receive a hinge guide 82 including a vertical space 88 such that the gap 86 and the vertical space 88 are substantially aligned to facilitate coupling of the door 24 with the hinge bracket assembly 10.

The hinge plate 26 may further include the protrusion 34 extending from the edge 38 of a second side of the hinge plate 26. In other words, the protrusion 34 may extend from the edge 38 of the hinge plate 26 opposite the hinge arm 30. The edge 38 may be substantially linear and may be positioned as a rear edge 38 of the hinge arm 30 so that the protrusion 34 is substantially co-planar with the hinge arm 30 and the hinge plate 26. The protrusion 34 may further be generally rectangular and may be sized to complement the slot 46 defined by the retention member 18 of the anchor plate 14. The protrusion 34 may further be sized such to limit movement of the protrusion 34 within the slot 46 by forming a close fit between the protrusion 34 and the slot 46. For example, upper and lower surfaces 90, 94 of the hinge plate 26 at the protrusion 34 may be positioned to abut lateral edges of the slot 46 to prevent vertical shifting of the protrusion 34 within the slot 46. Similarly, the protrusion 34 may have a width that is substantially equal to a width of the slot 46 to prevent inadvertent lateral movement of the hinge plate 26.

As discussed above, the hinge plate 26 defines the second receiving aperture 42. The second receiving aperture 42 may be defined proximate the hinge arm 30 and may have a generally rectangular shape configured to mirror the shape of the first receiving aperture 22. The second receiving aperture 42 may be sized to complement the first receiving aperture 22 and may be sized to at least partially receive the locking arm 50. When the protrusion 34 is received by the slot 46 of the retention member 18, the hinge plate 26 is coupled with the anchor plate 14, and the second receiving aperture 42 is subsequently aligned with the first receiving aperture 22.

The hinge plate 26 may include the rear edge 38 and first and second side edges 98, 102. At least one of the side edges 98, 102 is partially non-linear to form the hinge arm 30. In some examples, the first and second side edges 98, 102 may be partially non-linear and may be oriented substantially parallel to the receiving well 78 of the hinge arm 30.

The first side edge 98 may define a notch 106 having at least one interior linear edge 122. The notch 106 may be sized to receive the stop 66 when the hinge plate 26 is coupled and aligned with the anchor plate 14. In other words, the stop 66 may be received by the notch 106 when the hinge plate 26 is coupled with the anchor plate 14. When the stop 66 is received by the notch 106 and the hinge plate 26 is aligned with the anchor plate 14, the stop 66 may abut the linear edge 122. The stop 66 may further be sized such that the stop 66 forms a substantially close fit within the notch 106 to maintain engagement of the stop 66 with the notch 106. The stop 66 may further be configured to extend past and perpendicular to the upper surface 90 of the hinge plate 26 when the stop 66 is received by the notch 106, as discussed elsewhere herein.

Referring still to FIGS. 1B-4, a generally rounded protuberance 110 may extend from the upper surface 90 of the hinge plate 26. The protuberance 110 may have a generally oblong cross-sectional shape. In some examples, the protuberance 110 may define a guide 114 extending parallel with the first and second side edges 98, 102 of the hinge plate 26. The protuberance 110 may be positioned proximate the notch 106 such that the guide 114 extends parallel with the linear edge 122 of the notch 106. The parallel configuration of the guide 114 and the notch 106 allows the locking arm 50 to be positioned between the protuberance 110 and the stop 66 and/or within the guide 114 to secure the locking arm 50.

The hinge plate 26 may further define a plurality of openings 118 configured to each receive one of the plurality of flanges 70. Each of the plurality of openings 118 may further include a linear edge configured to abut the respective flange 70 when the hinge plate 26 is coupled with the anchor plate 14. For example, each of the plurality of openings 118 may be generally square or rectangular. Each of the plurality of flanges 70 is received by the respective opening 118 to limit movement of the hinge plate 26 when the hinge plate 26 is aligned and coupled with the anchor plate 14. In other words, each of the plurality of flanges 70 may be received by the respective opening 118 when the protrusion 34 is received by the slot 46 of the retention member 18. Each of the plurality of flanges 70 may be configured to act as a stop to prevent inadvertent movement of the hinge plate 26 in a direction perpendicular to the respective flange 70, limiting rotation or sliding of the hinge plate 26 relative to the anchor plate 14.

In the illustrated embodiment of FIGS. 1A-6, the corner member 54 is configured to fit on a corner of the appliance 12. The corner member 54 may be shaped to fit any appliance 12 proximate a hinge axis 138 defined by the receiving well 78 and/or the hinge guide 82 of the hinge plate 26, as shown in FIGS. 1A and 1B. The corner member 54 may further define a wrapper receiving aperture 142 proximate an edge of the corner member 54. The wrapper receiving aperture 142 may be configured to align with the first and second receiving apertures 22, 42 when the corner member 54 is positioned between the hinge plate 26 and the anchor plate 14. In various examples, the wrapper receiving aperture 142 may be formed after the corner member 54 is positioned between the hinge plate 26 and the anchor plate 14. In other examples, the wrapper receiving aperture 142 may be formed before the corner member 54 is positioned between the hinge plate 26 and the anchor plate 14 and may be configured to expand when the locking arm 50 is positioned within the first and second receiving apertures 22, 42 and the wrapper receiving aperture 142. The wrapper receiving aperture 142 is sized to at least partially receive the locking arm 50 and may be a similar size to the first and second receiving apertures 22, 42. Alternatively, the wrapper receiving aperture 142 may be larger or smaller than the first and second receiving apertures 22, 42 without departing from the scope of the present disclosure.

Figure 5:
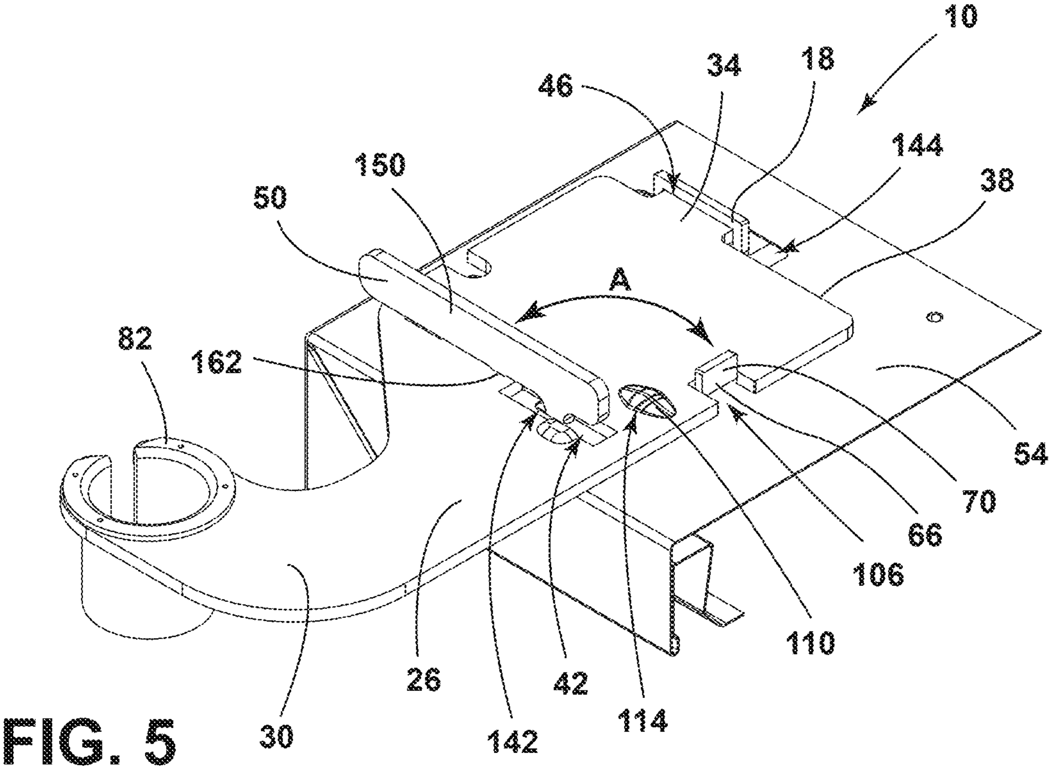
FIG. 5 is a side perspective view of the hinge plate, the wrapper portion, and the anchor plate of FIG. 4 with a locking arm positioned in a first position.
Figure 6:
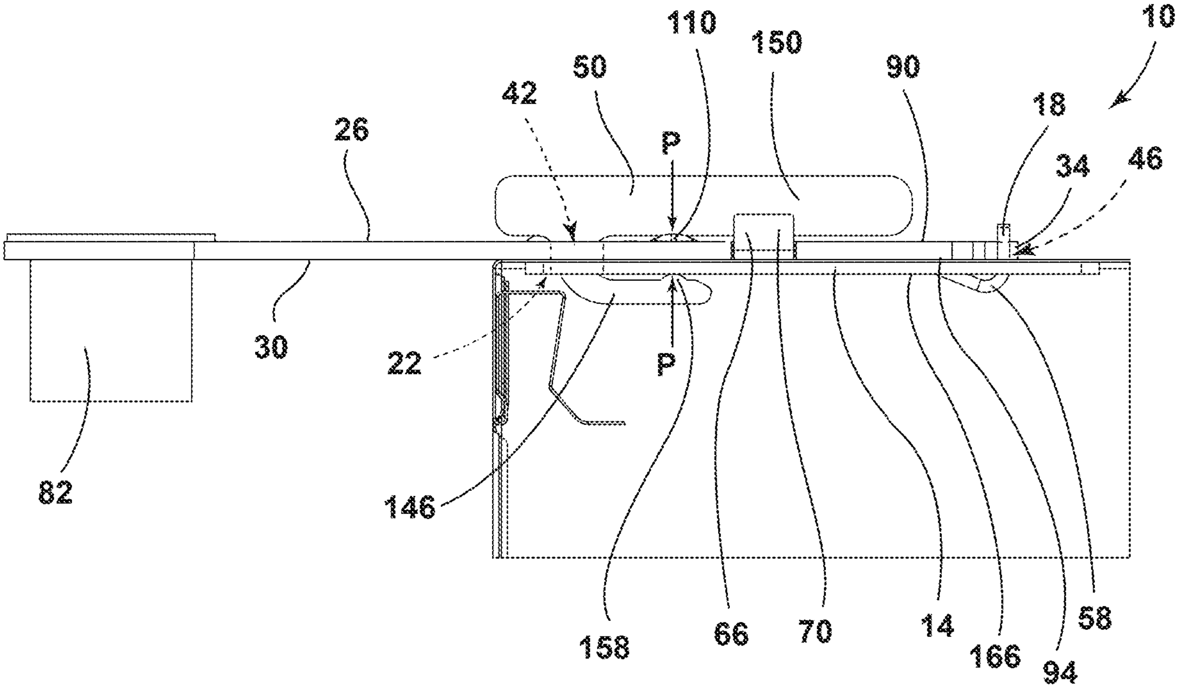
FIG. 6 is a side profile view of the hinge plate, the wrapper portion, and the anchor plate of FIG. 4 with a locking arm positioned in a second position.

As discussed previously, the locking arm 50 is configured to be at least partially received by the first and second receiving apertures 22, 42 and is rotatable between the locked position (FIG. 1B) and the unlocked position (FIG. 5). The locking arm 50 may be configured to securely couple the anchor plate 14 with the hinge plate 26 by applying a clamping pressure P to the upper surface 90 of the hinge plate 26 and a lower surface 166 of the anchor plate 14. The locking arm 50 may include a first portion 146 extending from a second portion 150. The first portion 146 and the second portion 150 may define a channel 154 sized to receive at least the anchor plate 14 and the hinge plate 26.

The first portion 146 is configured to be at least partially received by the first and second receiving apertures 22, 42 and the wrapper receiving aperture 142. The first portion 146 of the locking arm 50 may extend from the second portion 150 of the locking arm 50. In various examples, the first portion 146 may extend from an end of the second portion 150. In other examples, the first portion 146 may extend from a point between ends of the second portion 150. The first portion 146 may be configured as a J-shaped flange extending from an inner edge 164 of the second portion 150 and may have a length that is less than a length of the second portion 150. The inner edge 164 of the second portion 150 may be positioned to be substantially parallel with the upper surface 90 of the hinge plate 26 when the locking arm 50 is received by the first and second receiving apertures 22, 42. The inner edge 164 of the second portion 150 may further be substantially parallel with the inner edge 168 of the first portion 146 such that the first portion 146 and the second portion 150 are substantially parallel and co-planar.

A first tab 158 may extend from an inner edge 168 of the first portion 146 toward the inner edge 164 of the second portion 150. The first tab 158 may be generally rounded and may be configured to provide the clamping pressure P to the lower surface 166 of the anchor plate 14 when the locking arm 50 is in the locked position. Likewise, a second tab 162 may extend from the inner edge 164 of the second portion 150 toward the first tab 158. The second tab 162 may be generally rounded and may be configured to be received by the guide 114 of the protuberance 110 or to abut the protuberance 110. The second tab 162 may be configured to apply the clamping pressure P to the upper surface 90 of the hinge plate 26.

Referring now to FIGS. 2 and 5, when the locking arm 50 is positioned through the first and second receiving apertures 22, 42 and the wrapper receiving apertures 142, the locking arm 50 is in the unlocked position. The locking arm 50 is rotatable along arrow A between the unlocked position and the locked position. As the locking arm 50 rotates between the unlocked position and the locked position, the first and second tabs 158, 162 are movable across the lower surface 166 of the anchor plate 14 and the upper surface 90 of the hinge plate 26, respectively. When the locking arm 50 is in the locked position, the inner edge 164 and/or the second tab 162 of the second portion 150 may be rotated across the protuberance 110 of the hinge plate 26. In some examples, the inner edge 164 and/or the second tab 162 may be received by the guide 114 of the protuberance 110. The protuberance 110 is configured to prevent inadvertent rotation of the locking arm 50 from the locked position into the unlocked position. Further, when the locking arm 50 is in the locked position, the second portion 150 may be positioned to abut the stop 66 of the anchor plate 14, preventing over-rotation of the locking arm 50. In other words, when the locking arm 50 is in the locked position, the second portion 150 of the locking arm 50 may be positioned between the protuberance 110 and the stop 66 to prevent inadvertent rotation of the locking arm 50 in any direction.

Figure 7A:
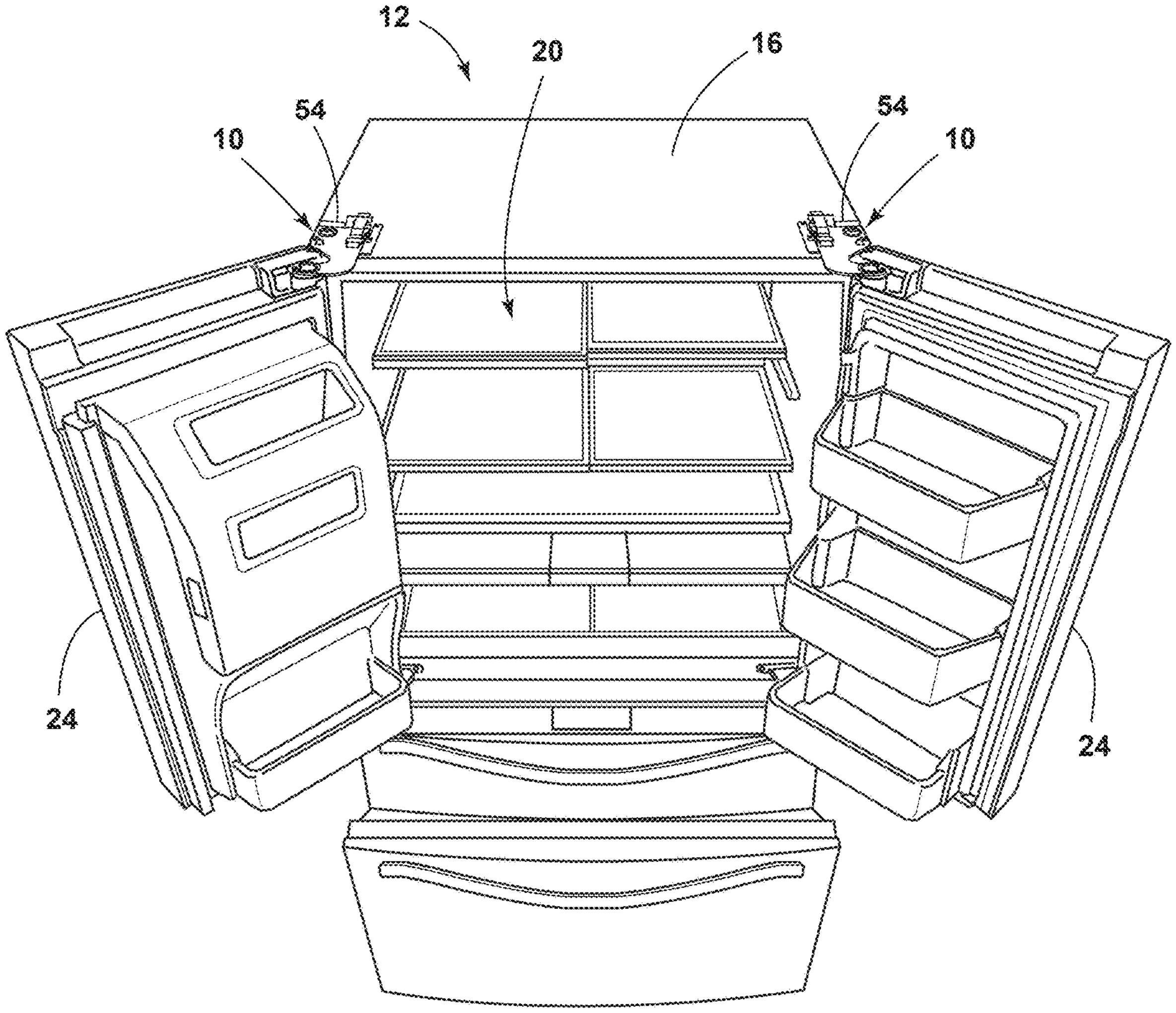
FIG. 7A is a top perspective view of an appliance including a hinge bracket assembly, according to various examples.
Figure 7B:
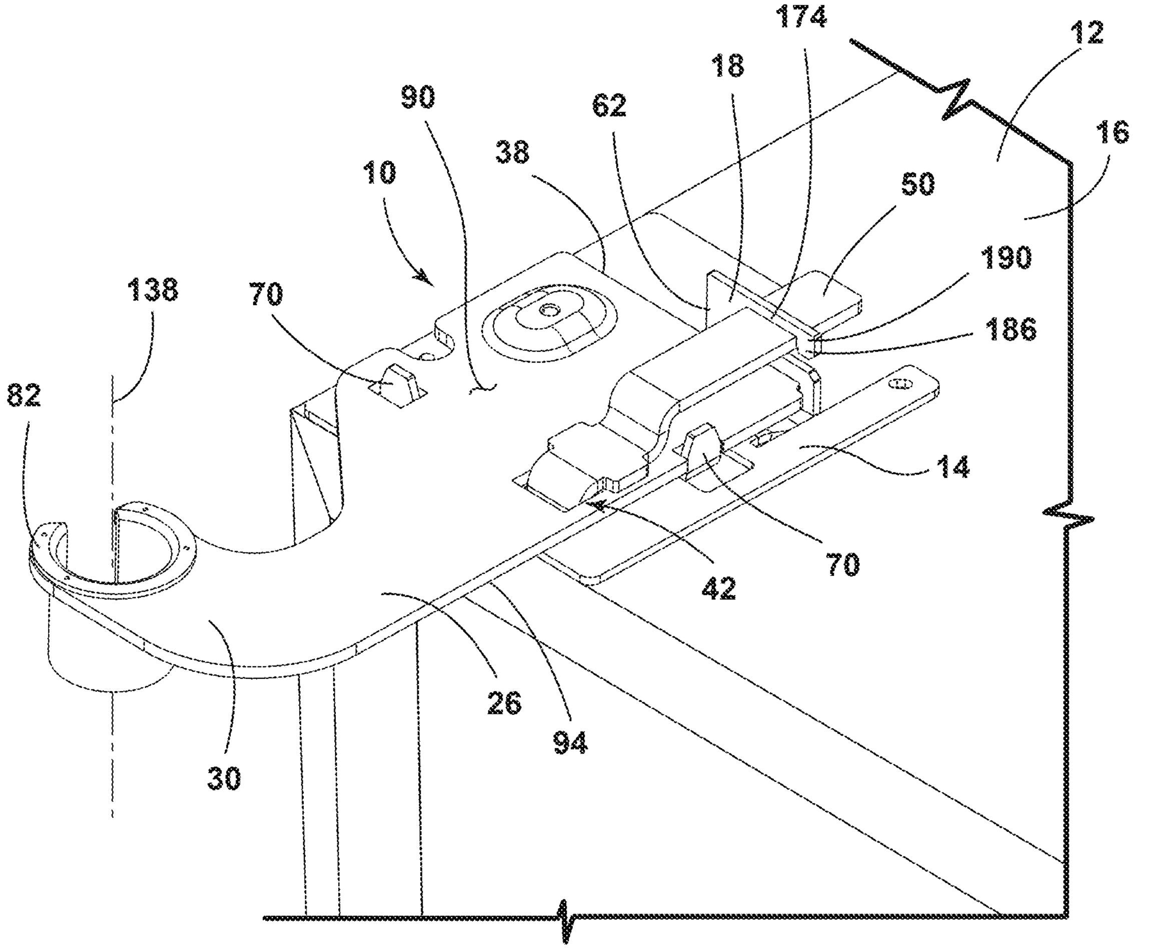
FIG. 7B is a side perspective view of the hinge bracket assembly coupled with the appliance of FIG. 7A.
Figure 8:
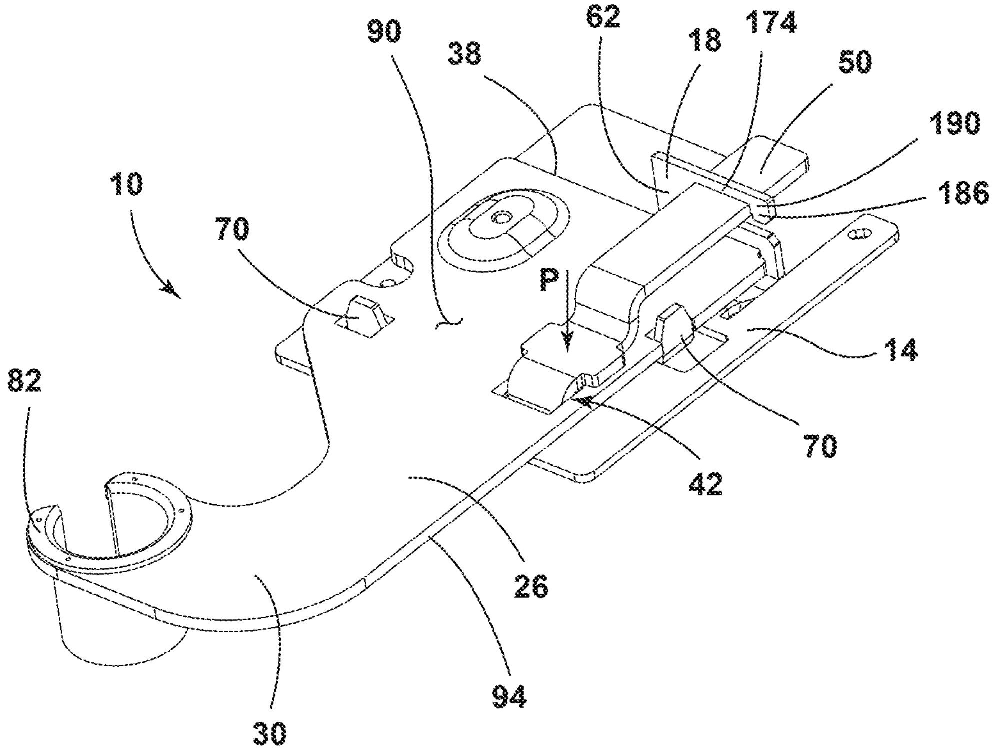
FIG. 8 is a top perspective view of a hinge bracket assembly, according to various examples.
Figure 9:
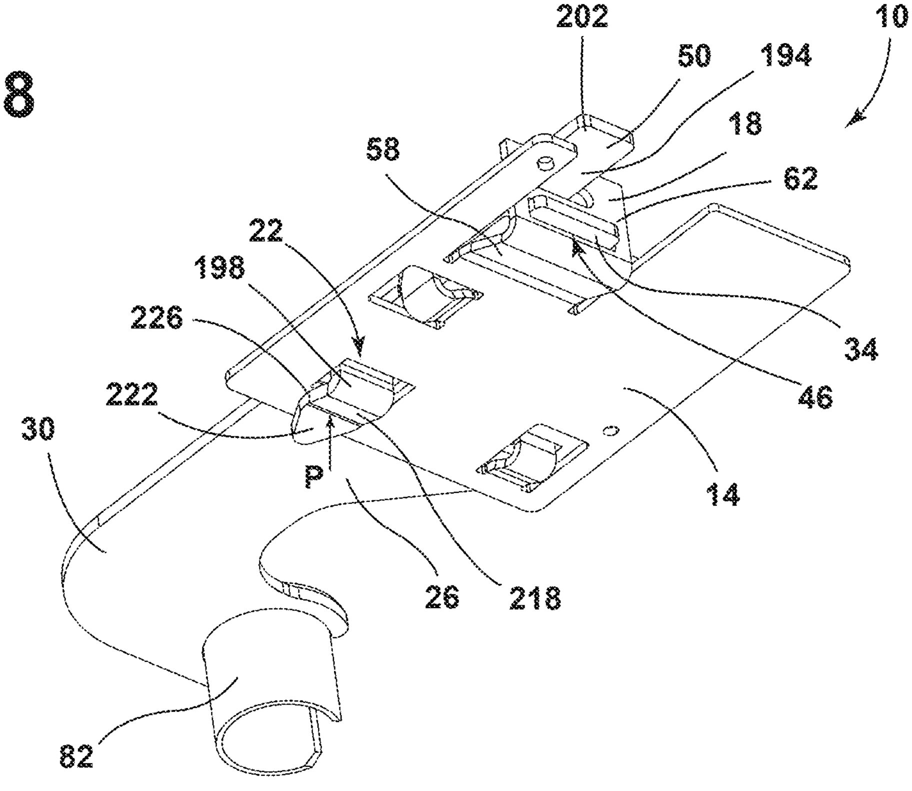
FIG. 9 is a bottom perspective view of the hinge bracket assembly of FIG. 8.

Referring now to FIGS. 7A-8, the appliance 12 is shown including the hinge bracket assembly 10, according to various examples. The hinge bracket assembly 10 includes the anchor plate 14 coupled with the hinge plate 26. As discussed previously, the corner member 54 may be positioned between the anchor plate 14 and the hinge plate 26. The locking arm 50 may be movable between an unlocked position and a locked position. When the locking arm 50 is in the locked position, the locking arm 50 may be configured to couple the anchor plate 14 with the hinge plate 26.

Referring now to FIGS. 7B-9, the anchor plate 14 may be generally square, as illustrated. Alternatively, the anchor plate 14 may be rectangular or may be any other shape without departing from the scope of the present disclosure. As discussed previously, the anchor plate 14 may include the retention member 18 extending perpendicularly from the anchor plate 14. The retention member 18 may be coupled with or continuously and integrally formed with the anchor plate 14, as discussed with reference to FIGS. 1B and 2. The retention member 18 may include the body portion 58 extending at least partially co-planar with the anchor plate 14 and the arm 62 extending perpendicularly from the body portion 58, as discussed above.

The arm 62 of the retention member 18 may define the slot 46 configured to receive the protrusion 34 of the hinge plate 26, as discussed above. The slot 46 may be substantially rectangular, square, or any other shape including linear edges and may extend any width across the arm 62. The slot 46 may be sized to receive the protrusion 34 of the hinge plate 26. The slot 46 may be defined by the arm 62 of the retention member 18 such that the arm 62 secures the protrusion 34 against vertical displacement with little or no deflection, as discussed elsewhere herein.

The arm 62 may further include a projection 174 forming an upper edge of the arm 62. The projection 174 may at least partially define a retention space 178 in communication with an opening 182. The retention space 178 may be defined to extend parallel with the slot 46. The slot 46 may be defined between the retention space 178 and the anchor plate 14 and/or the body portion 58 of the retention member 18. A lip 186 may extend from a terminal end 190 of the projection 174 and partially into the opening 182. The lip 186 may be configured to act as a stop for the locking arm 50 and may prevent inadvertent release of the locking arm 50 from the retention space 178, as discussed in more detail elsewhere herein.

The anchor plate 14 may further include the plurality of flanges 70 extending substantially perpendicularly from the anchor plate 14. In other words, each of the plurality of flanges 70 may extend outward from the anchor plate 14. Like the retention member 18, the plurality of flanges 70 may be integrally formed with the anchor plate 14 and may be spaced to align the hinge plate 26 with the anchor plate 14, as previously discussed elsewhere herein.

The anchor plate 14 may further define the first receiving aperture 22 having a generally square or rectangular shape. The first receiving aperture 22 may be defined proximate the front edge 72 and may be sized to at least partially receive the locking arm 50. The first receiving aperture 22 may further be defined to align with the retention member 18 of the anchor plate 14, and more specifically to align with the retention space 178 of the retention member 18. Aligning the first receiving aperture 22 and the retention space 178 may facilitate positioning the locking arm 50 at least partially within the retention space 178 of the retention member 18, as discussed in more detail elsewhere herein.

Referring still to FIGS. 7B-9, the hinge plate 26 is positioned to be aligned with the anchor plate 14, as discussed previously. The hinge plate 26 may be substantially similar to the hinge plate 26, as shown in FIGS. 1A-6. The hinge plate 26 may include the hinge arm 30 extending from the first side of the hinge plate 26 and the protrusion 34 extending from the edge 38 of the second side of the hinge plate 26. In other words, the protrusion 34 may extend from the edge 38 of the hinge plate 26 opposite the hinge arm 30, as discussed previously.

The hinge plate 26 may further include the rear edge 38 and the first and second side edges 98, 102. At least one of the side edges 98, 102 may define the notch 106 having at least one interior linear edge 122, as previously described with reference to FIGS. 1A-4. The notch 106 may be sized to receive one of the plurality of flanges 70 when the hinge plate 26 is coupled and aligned with the anchor plate 14. When the respective flange 70 is received by the notch 106, the flange 70 may abut the linear edge 122 defining the notch 106 to prevent sliding of the hinge plate 26 relative to the anchor plate 14 when the hinge plate 26 is coupled with the anchor plate 14.

The hinge plate 26 may define the second receiving aperture 42 proximate the hinge arm 30 and having a generally square shape. The second receiving aperture 42 may be sized to complement the first receiving aperture 22 and to at least partially receive the locking arm 50. When the protrusion 34 is received by the slot 46 of the retention member 18, the hinge plate 26 is coupled and aligned with the anchor plate 14 such that the second receiving aperture 42 is aligned with the first receiving aperture 22.

The hinge plate 26 may further define the plurality of openings 118. Each of the plurality of openings 118 includes a linear edge 122 and may be defined by the hinge plate 26 to receive one of the plurality of flanges 70, as discussed previously with reference to FIGS. 1B-4. Each of the flanges 70 is received by the respective opening 118 to limit rotational movement and/or sliding of the hinge plate 26 when the hinge plate 26 is aligned and coupled with the anchor plate 14.

Figure 10:
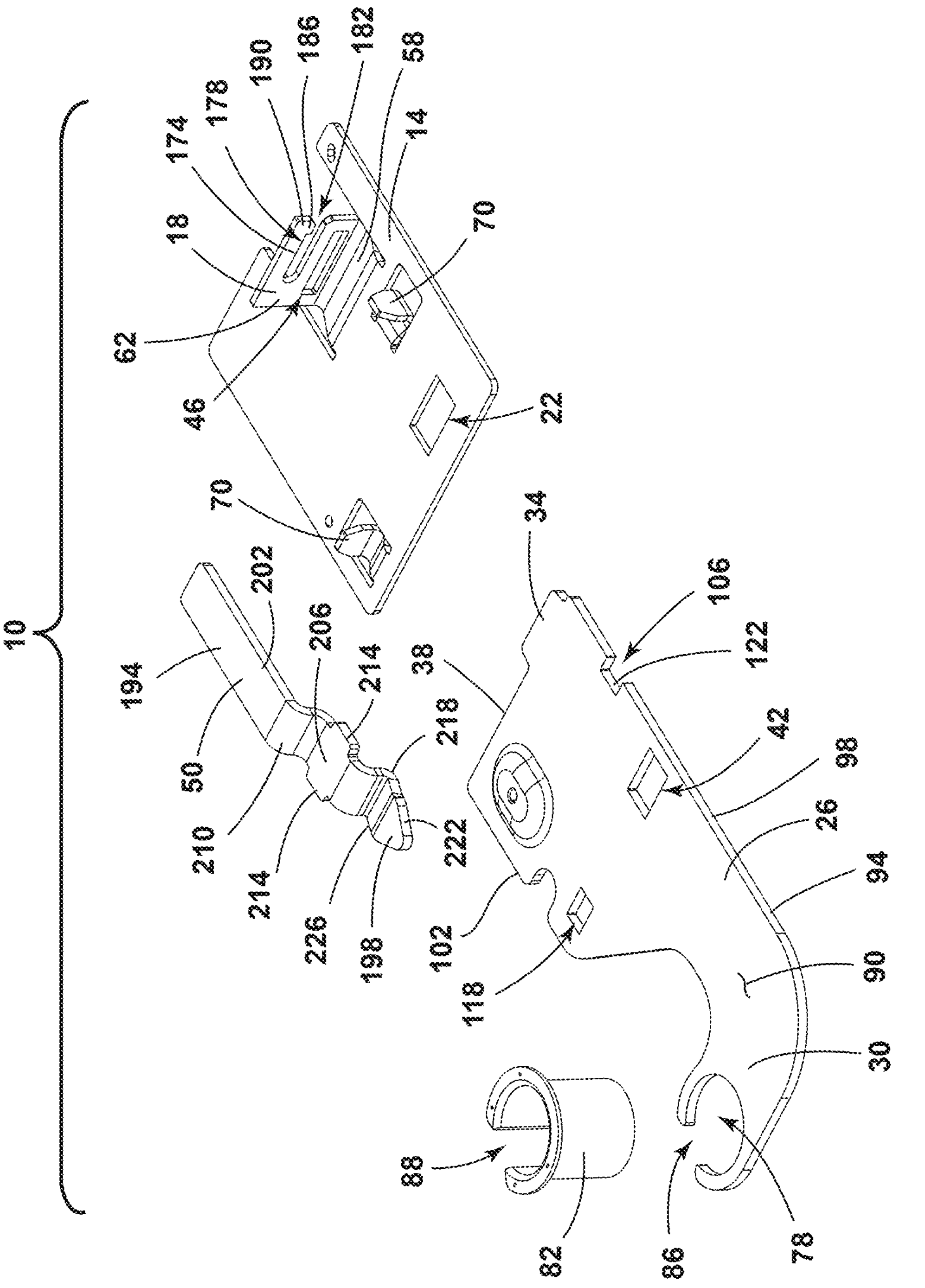
FIG. 10 is an exploded view of the hinge bracket assembly of FIG. 8.
Figure 11:
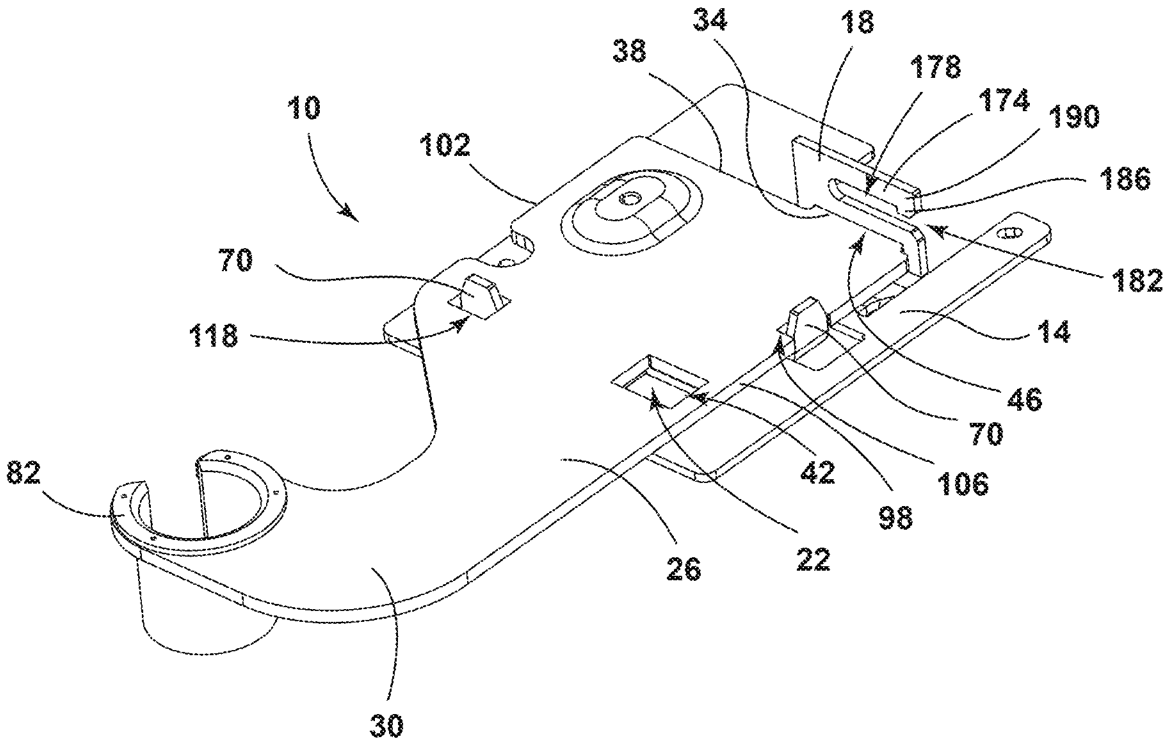
FIG. 11 is a top perspective view of a hinge plate coupled with an anchor plate, according to various examples.

Referring now to FIGS. 7B-12, the locking arm 50 may be movable between the locked position (FIG. 7B) and the unlocked position (FIG. 10). The locking arm 50 may include a body 194 and a nose 198 extending from the body 194. The nose 198 may be at least partially received by the first and second receiving apertures 22, 42 when the locking arm 50 is in the locked position to couple the hinge plate 26 with the anchor plate 14.

The body 194 of the locking arm 50 may include an upper portion 202 and a lower portion 206 continuously formed and spaced apart by a step 210. The upper portion 202 may be configured to be received by, or engaged with, the retention space 178 of the retention member 18 when the locking arm 50 is in the locked position. The lower portion 206 may be substantially flush with the upper surface 90 of the hinge plate 26 when the locking arm 50 is in the locked position. The height of the retention member 18 and the positioning of the retention space 178 may be determined by the spacing of the upper and lower portions 202, 206 of the locking arm 50 as spaced apart by the step 210. In other words, the distance between the upper surface 90 of the hinge plate 26 and the retention space 178 may be substantially equivalent to the height of the step 210 of the body 194 of the locking arm 50.

The lower portion 206 may further include one or more fins 214 extending perpendicular to the upper portion 202 and the lower portion 206. The fins 214 may further be co-planar with the lower portion 206 of the locking arm 50. The fins 214 may be positioned as a pair of opposing fins extending from the lower portion 206 and may be substantially flush with the upper surface 90 of the hinge plate 26 when the locking arm 50 is in the locked position.

The nose 198 may extend from a side of the lower portion 206 of the locking arm 50 opposite the upper portion 202 of the locking arm 50. The nose 198 may include a base portion 218 and an angular portion 222 joined at a vertex. The base portion 218 may extend from the lower portion 206 at a predetermined angle relative to the lower portion 206. Likewise, the angular portion 222 may extend from the lower portion 206 at a predetermined angle to define the vertex. The angular portion 222 may further have a wedge-shape culminating in a point.

The nose 198, including the base portion 218 and the angular portion 222, may be received by the first and second receiving apertures 22, 42. When the locking arm 50 is in the locked position, the base portion 218 may be inclined upward and away from the lower portion 206 of the body 194 toward the lower surface 166 of the anchor plate 14. Similarly, the angular portion 222 may be inclined downward from the lower surface 166 of the anchor plate 14.

A raised surface 226 may be positioned at the vertex between the base portion 218 and the angular portion 222. The raised surface 226 may be generally rounded and may abut the lower surface 166 of the anchor plate 14 when the locking arm 50 is in the locked position. The raised surface 226 may be configured to abut and apply clamping pressure P to the lower surface 166 of the anchor plate 14 to leverage the anchor plate 14 upward toward the hinge plate 26 when the locking arm 50 is in the locked position. Likewise, the fins 214 of the lower portion 206 may be configured to apply clamping pressure P to the upper surface 90 of the hinge plate 26 to couple the anchor plate 14 with the hinge plate 26 when the locking arm 50 is in the locked position, as discussed in more detail below.

Figure 12:
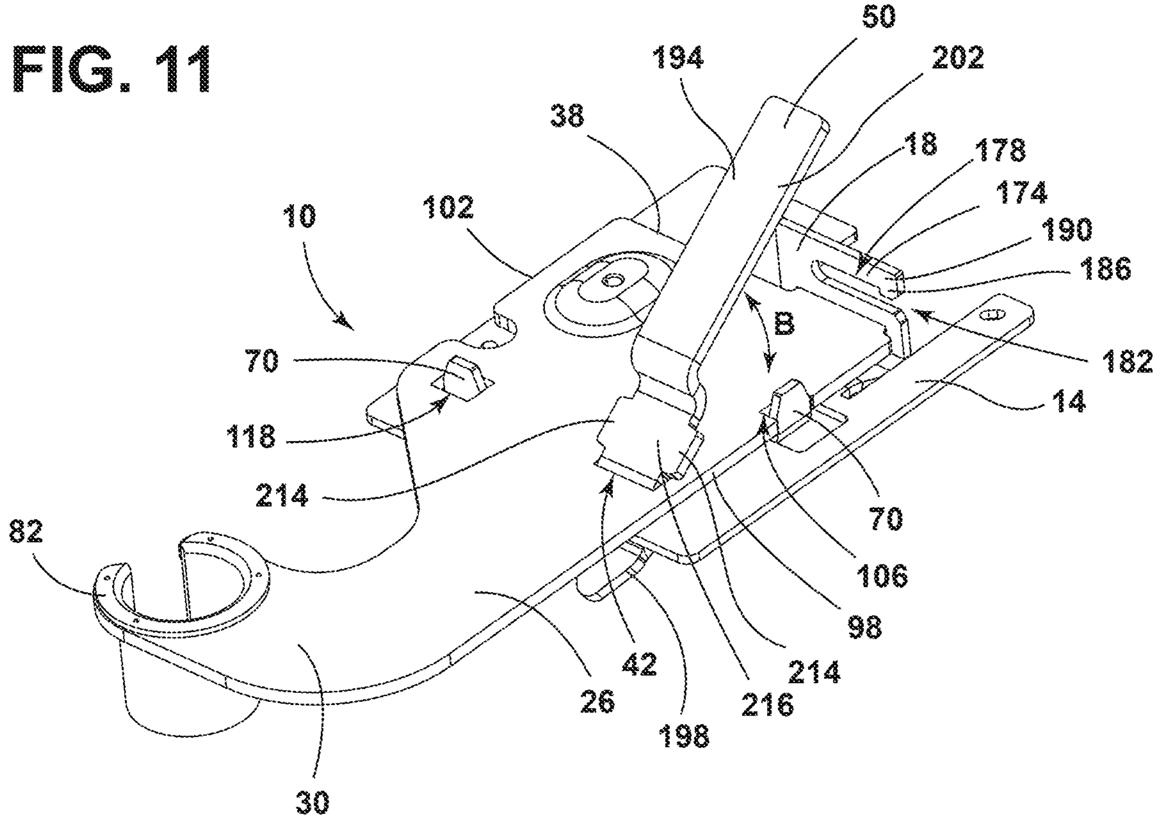
FIG. 12 is a top perspective view of the hinge plate and the anchor plate of FIG. 11 including a locking arm in a first position.

Referring now to FIGS. 8-13, when the hinge plate 26 is aligned with the anchor plate 14 and the protrusion 34 is received by the slot 46 of the retention member 18, the first and second receiving apertures 22, 42 are aligned, as previously discussed. The locking arm 50 may be vertically inserted into the first and second receiving apertures 22, 42. In other words, the locking arm 50 may be oriented in a first position, or an unlocked position. The nose 198 of the body 194 of the locking arm 50 may be received by the first and second receiving apertures 22, 42 until one or both of the fins 214 of the lower portion 206 abut the upper surface 90 of the hinge plate 26, as shown in FIG. 12. The locking arm 50 may then be rotated along arrow B such that the upper portion 202 of the body 194 of the locking arm 50 is substantially parallel with the hinge plate 26 (FIG. 12). In other words, the locking arm 50 may be rotated from the first position into a second position. This rotation orients the lower portion 206 substantially flush with the upper surface 90 of the hinge plate 26.

Figure 13:
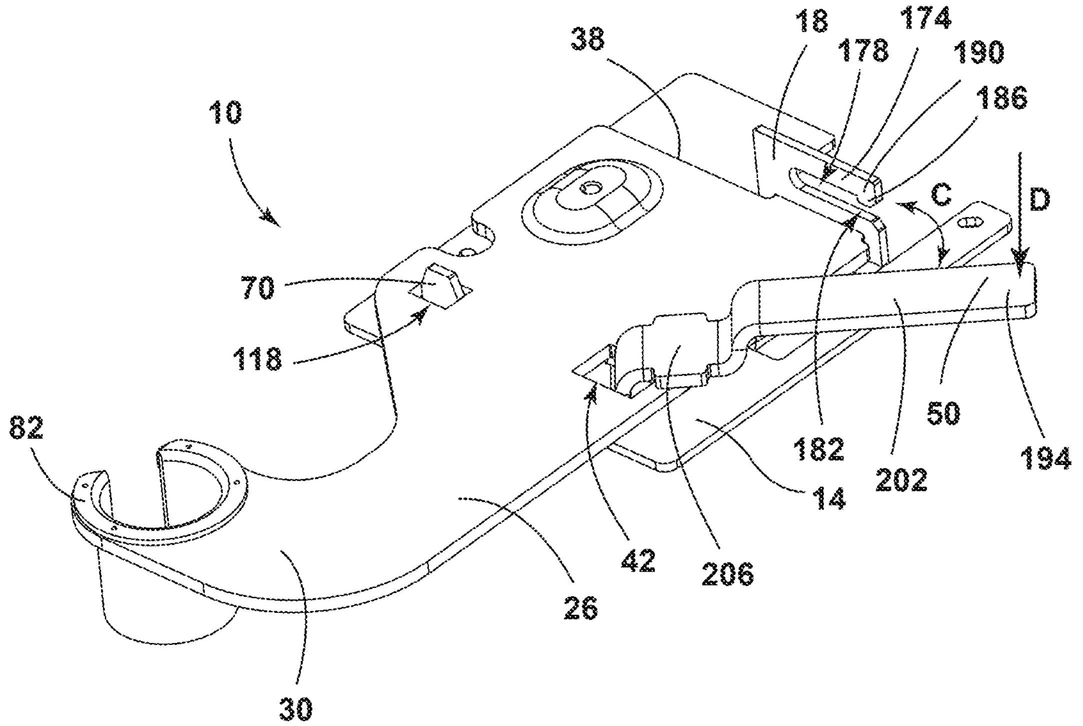
FIG. 13 is a top perspective view of the hinge plate and the anchor plate of FIG. 10 including a locking arm in a second position.

As shown in FIG. 13, the locking arm 50 may then be rotated along arrow C into the retention space 174 of the retention member 18. The upper portion 202 of the body 194 of the locking arm 50 may be depressed along arrow D to allow the locking arm 50 to pass the lip 186 of the projection 174 of the retention member 18 so that the upper portion 202 may be received by the retention space 174. The lip 186 may then act as a stop to prevent inadvertent release of the locking arm 50 from the locked position, or third position.

Referring now to FIGS. 14A-19B, a hinge bracket assembly 310 is illustrated coupled with a door 24 of an appliance 12, according to various examples. Specifically, each door 24 of the appliance 12 is at least partially coupled with the cabinet 16 of the appliance 12 by a respective hinge bracket assembly 310. It will be understood that components and features of the hinge bracket assembly 310 may be similar to those shown in any one of FIGS. 1A-13 where the same or similar reference numbers are used. It is also contemplated that any of the embodiments illustrated in FIGS. 1A-13 may be coupled with a top wall 302 of an outer wrapper 300 of an appliance 12 via engagement of an anchor plate 314 with a plurality of receiving spaces 308*a*, 308*b*, 308*c* as discussed below without departing from the scope of the present disclosure.

Figure 14A:
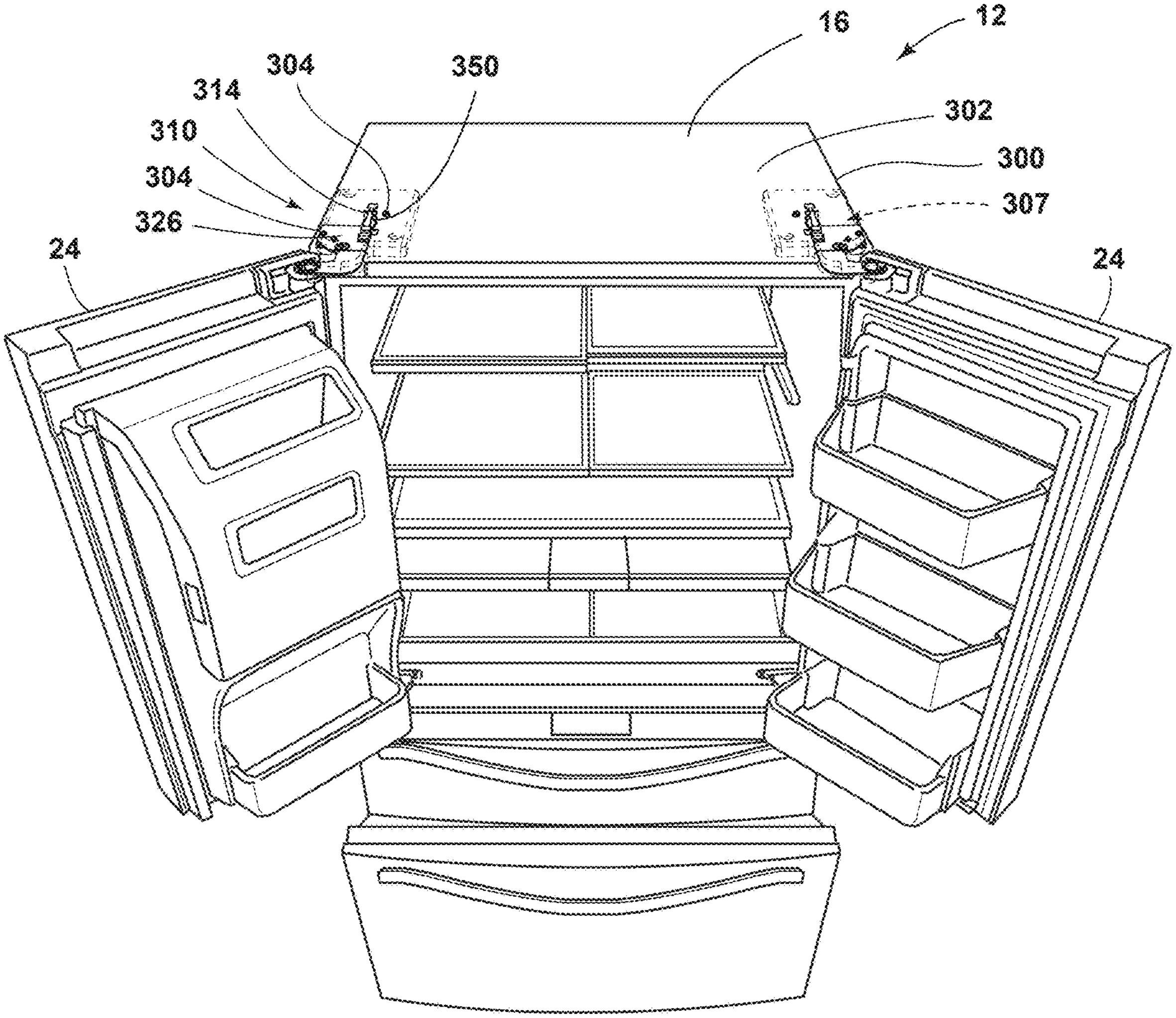
FIG. 14A is a top perspective view of an appliance including a hinge bracket assembly, according to various examples.
Figure 14B:
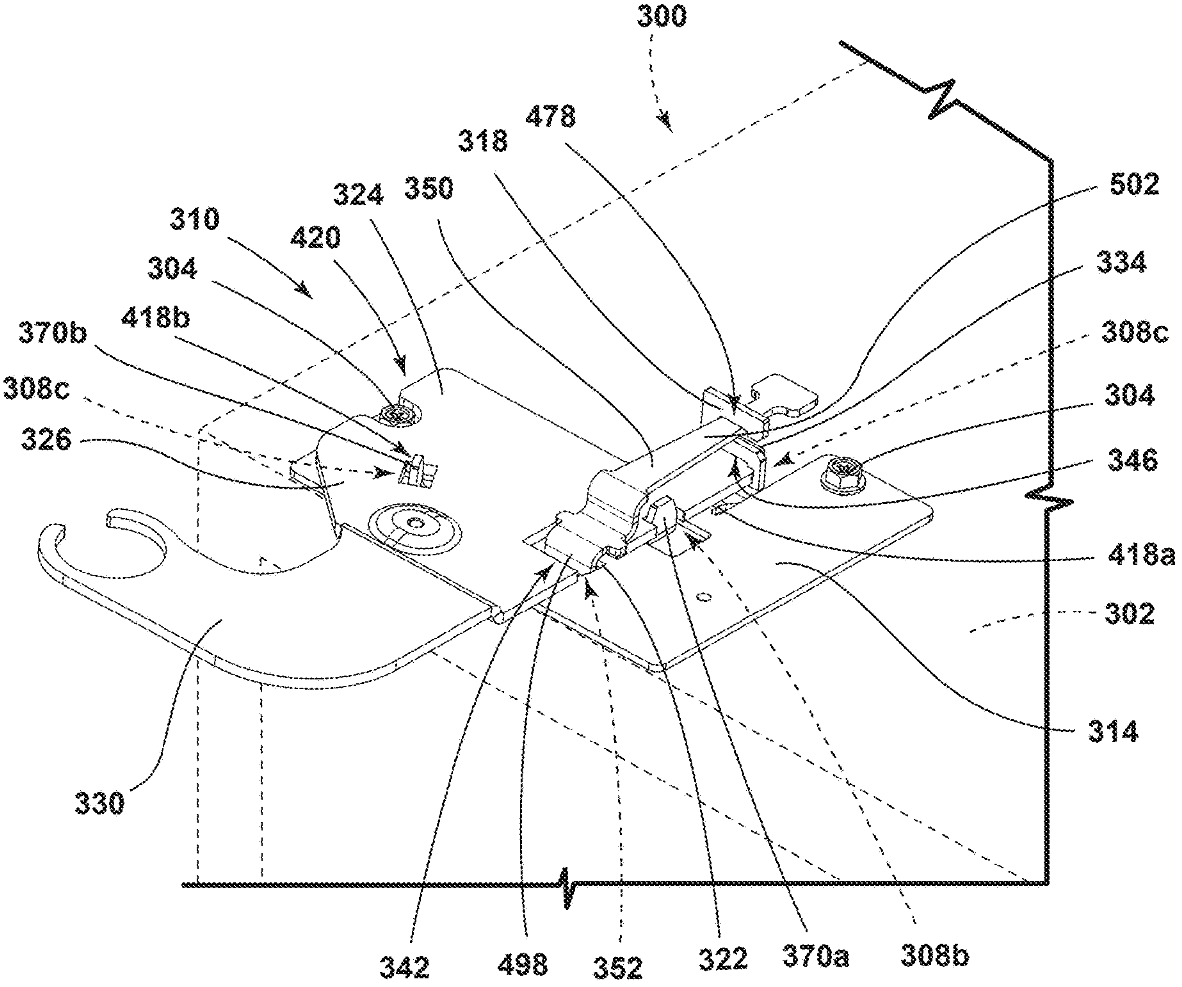
FIG. 14B is a side perspective view of the hinge bracket assembly coupled with a wrapper of the appliance of FIG. 14A.

As shown in FIGS. 14A and 14B, the hinge bracket assembly 310 is illustrated coupled with an outer wrapper 300 of the appliance 12. The outer wrapper 300 includes a top wall 302 forming a top surface of the cabinet 16, and the hinge bracket assembly 310 is coupled with at least the top wall 302 to rotatably couple the door 24 with the cabinet 16 of the appliance 12. Where the door 24 is one of a pair of doors 24, each door 24 may be coupled with the cabinet 16 of the appliance 12 with a separate hinge bracket assembly 310. Each hinge bracket assembly 310 includes an anchor plate 314 coupled with the top wall 302 of the wrapper 300 by fasteners 304. The top wall 302 may define apertures 306 configured to receive the fasteners 304, as discussed in more detail elsewhere herein. A locking arm 350 is selectively coupled with the anchor plate 314 and a hinge plate 326 to removably couple the hinge plate 326 with the anchor plate 314. As illustrated, the locking arm 350 is movable between an unlocked position (FIG. 19A) and a locked position (FIG. 14B). In the locked position, the locking arm 350 couples the hinge plate 326 with the anchor plate 314. As shown in phantom in FIG. 14A, a cover 307 may be coupled with the cabinet 16 to conceal the hinge bracket assembly 310. Further, while the description of FIGS. 14A-19B is focused on a single hinge bracket assembly 310, it will be understood that the features and connections of each hinge bracket assembly 310 illustrated in FIG. 14A are the same or substantially similar such that the description herein applies to both hinge bracket assemblies 310.

Referring now to FIGS. 14B-16, the top wall 302 of the wrapper 300 defines a plurality of receiving spaces 308*a*, 308*b*, 308*c*. A first wrapper receiving space 308*a* is defined extending parallel to a front edge of the top wall 302. A second wrapper receiving space 308*b* is defined extending perpendicular to the first wrapper receiving space 308*a*. A third wrapper receiving space 308*c* is defined extending at an angle A relative to the first wrapper receiving space 308*a*. Each of the receiving spaces 308*a*, 308*b*, 308*c* may be substantially rectangular and are sized to allow adjustment of the anchor plate 314 when the anchor plate 314 is coupled with the wrapper 300, as discussed in more detail elsewhere herein.

Figure 15:
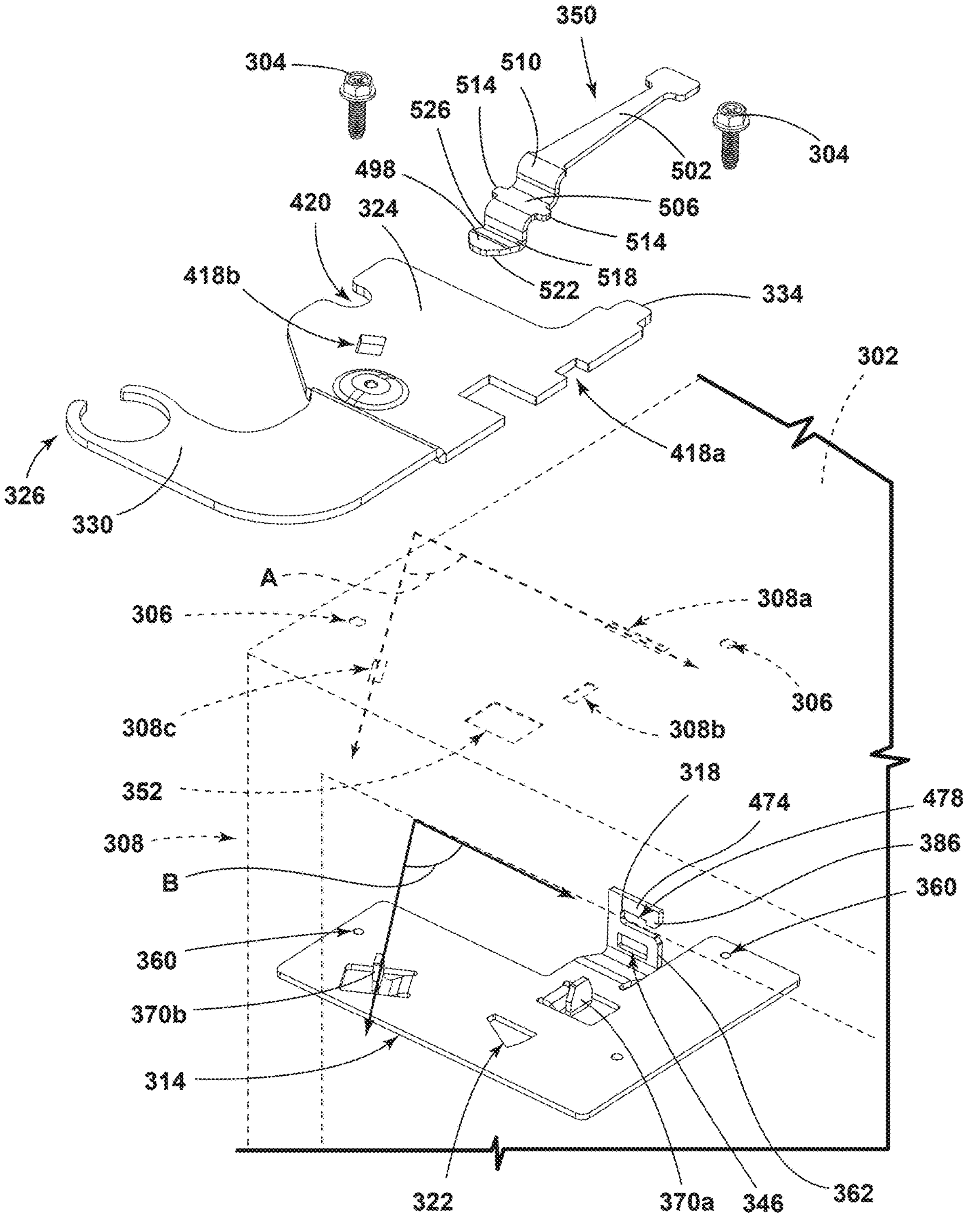
FIG. 15 is an exploded view of the hinge bracket assembly of FIG. 14B.
Figure 16:
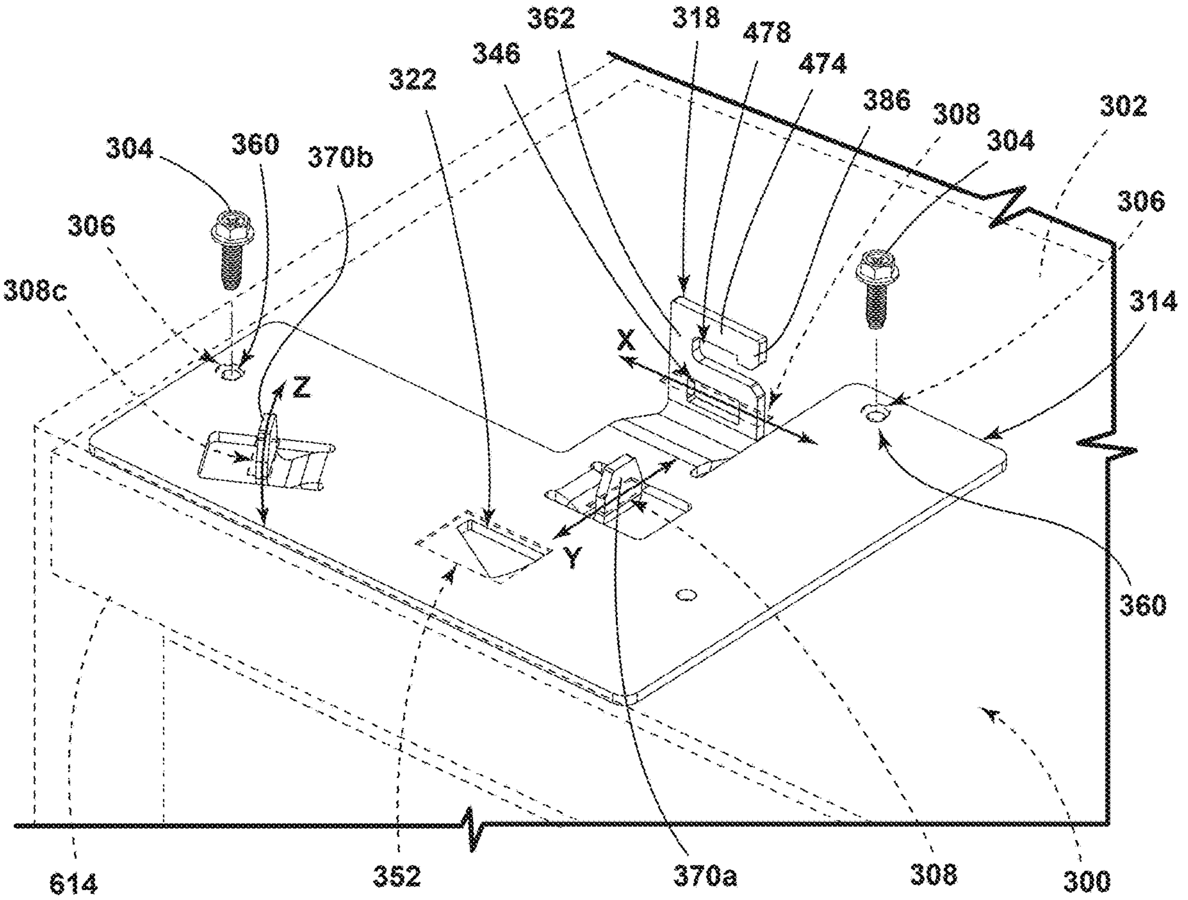
FIG. 16 is a top perspective view of an anchor plate coupled with the wrapper of FIG. 14B.

As illustrated in FIGS. 15 and 16, the anchor plate 314 may be generally L-shaped. Alternatively, the anchor plate 314 may be square, rectangular, or any other shape without departing from the scope of the present disclosure. The anchor plate 314 includes a retention member 318 extending perpendicularly from the anchor plate 314. The retention member 318 may be coupled with or continuously and integrally formed with the anchor plate 314, as discussed at least with reference to the anchor plate 14 of FIGS. 1B and 2. The retention member 318 may extend at least partially co-planar with the anchor plate 314. The retention member 318 may be substantially linear or may include an arcuate portion to provide for a deflection of the retention member 318 in a direction perpendicular to the anchor plate 314. The retention member 318 further defines through-holes 360 configured to receive the fasteners 304 to couple the anchor plate 314 with the wrapper 300.

As illustrated in FIG. 16, an arm 362 extends perpendicularly from the body portion 358. The arm 362 of the retention member 318 may define a slot 346. The slot 346 may be substantially rectangular, square, or any other shape including linear edges and may extend any distance across the width of the arm 362. The slot 346 is sized to receive a protrusion 334 of the hinge plate 326 when the hinge plate 326 is coupled with the anchor plate 314.

The arm 362 may further include a projection 474 forming an upper edge of the arm 362. The projection 474 may at least partially define a retention space 478. The retention space 478 may be defined to extend substantially parallel with the slot 346. The slot 346 may be defined between the retention space 478 and the anchor plate 314 and/or the body portion 358 of the retention member 318. A lip 486 may extend from a terminal end of the projection 474. The lip 486 may be configured to act as a stop for the locking arm 350 and may prevent inadvertent release of the locking arm 350 from the retention space 478 when the locking arm 350 is in the locked position.

With continued reference to FIG. 16, the anchor plate 314 may further include at least first and second flanges 370*a*, 370*b* extending substantially perpendicularly from the anchor plate 314. The first flange 370*a* is oriented perpendicular to the retention member 318 of the anchor plate 314. The second flange 370*b* is positioned at an angle B relative to the retention member 318. The angle B is substantially similar to the angle A between the first and third receiving spaces 308*a*, 308*c* of the top wall 302 of the wrapper 300. Like the retention member 318, the first and second flanges 370*a*, 370*b* may be integrally formed with the anchor plate 314 and may be configured to align the hinge plate 326 with the anchor plate 314, as previously discussed with respect to FIGS. 1-13.

The anchor plate 314 may further define a first locking aperture 322 configured to receive a portion of the locking arm 350. The first locking aperture 322 may be defined to align with the retention member 318 of the anchor plate 314, and more specifically to be collinear with the retention space 478 of the retention member 318. Aligning the first locking aperture 322 and the retention space 478 may facilitate positioning the locking arm 350 at least partially within the retention space 478 of the retention member 318, as discussed in more detail elsewhere herein.

Figure 17:
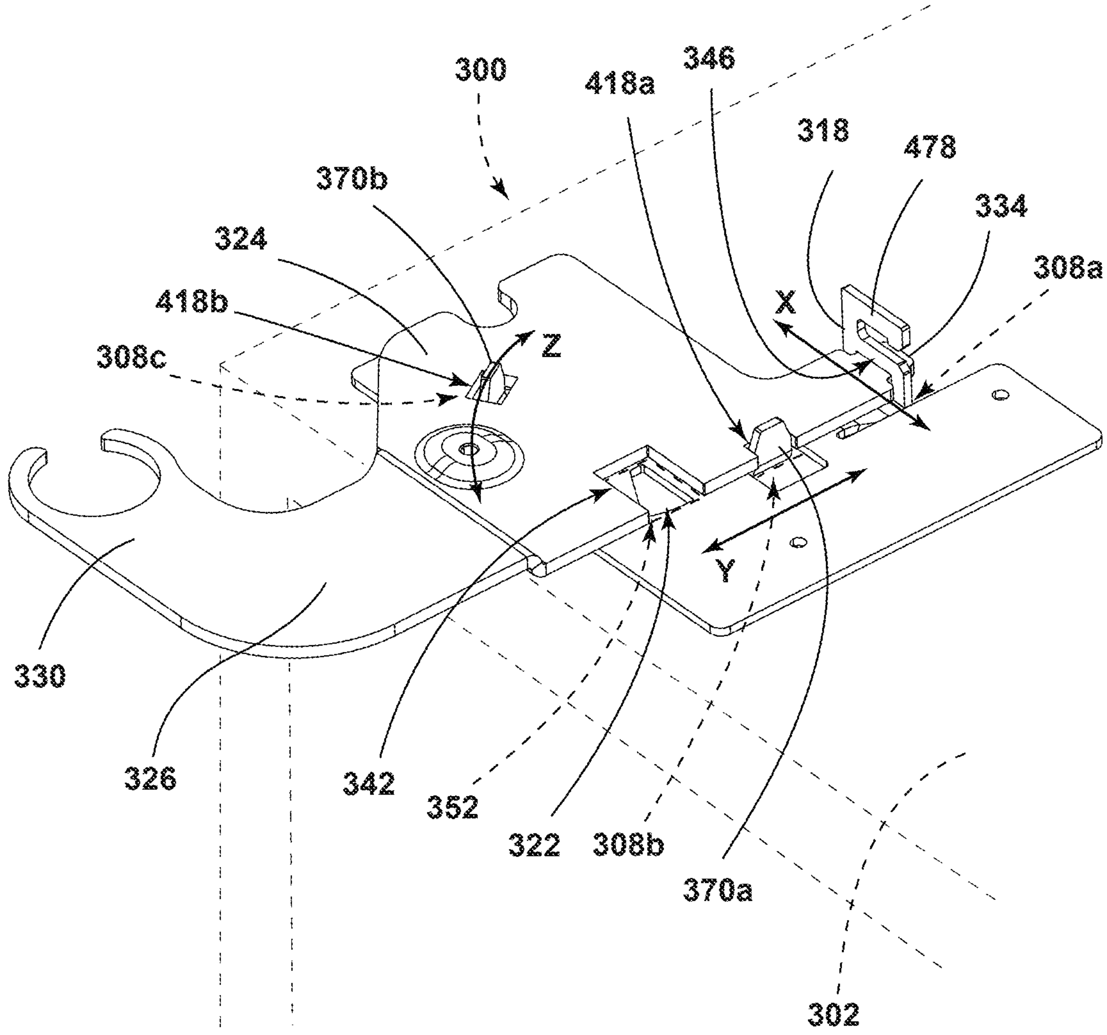
FIG. 17 is a top perspective view of a hinge plate coupled with the anchor plate of FIG. 16.

Referring still to FIGS. 15 and 17, the hinge plate 326 is positioned to be aligned with the anchor plate 314, as discussed previously. The hinge plate 326 may be substantially similar to the hinge plates 26 shown in FIGS. 1A-6 and/or FIGS. 7-13. The hinge plate 326 may include a hinge arm 330 extending from a body 324 of the hinge plate 326 in a first direction and a protrusion 334 extending from the body 324 of the hinge plate 326 in a second direction, the second direction opposite the first direction.

The hinge plate 326 may define a second locking aperture 342 proximate the hinge arm 330 and having a generally square shape. The second locking aperture 342 may be only partially defined by the body 324 (e.g., the second locking aperture 342 may be defined as a slot with an open end). The second locking aperture 342 may be sized to complement the first locking aperture 322 and to at least partially receive the locking arm 350. When the protrusion 334 is received by the slot 346 of the retention member 318, the hinge plate 326 is coupled and aligned with the anchor plate 314 such that the second locking aperture 342 is aligned with the first locking aperture 322.

The hinge plate 326 may further define the plurality of openings 418*a*, 418*b*. As shown in FIG. 17, each of the plurality of openings 418*a*, 418*b* is defined by the hinge plate 326 to receive one of the plurality of flanges 370*a*, 370*b*. Each of the flanges 370*a*, 370*b* is received by the respective opening 418*a*, 418*b* to limit rotational movement and/or sliding of the hinge plate 326 when the hinge plate 326 is aligned and coupled with the anchor plate 314. The hinge plate 326 may also define one or more openings 420 for receiving the fasteners 304 when the fasteners 304 are positioned to couple the anchor plate 314 with the top wall 302 of the wrapper 300.

Figure 18:
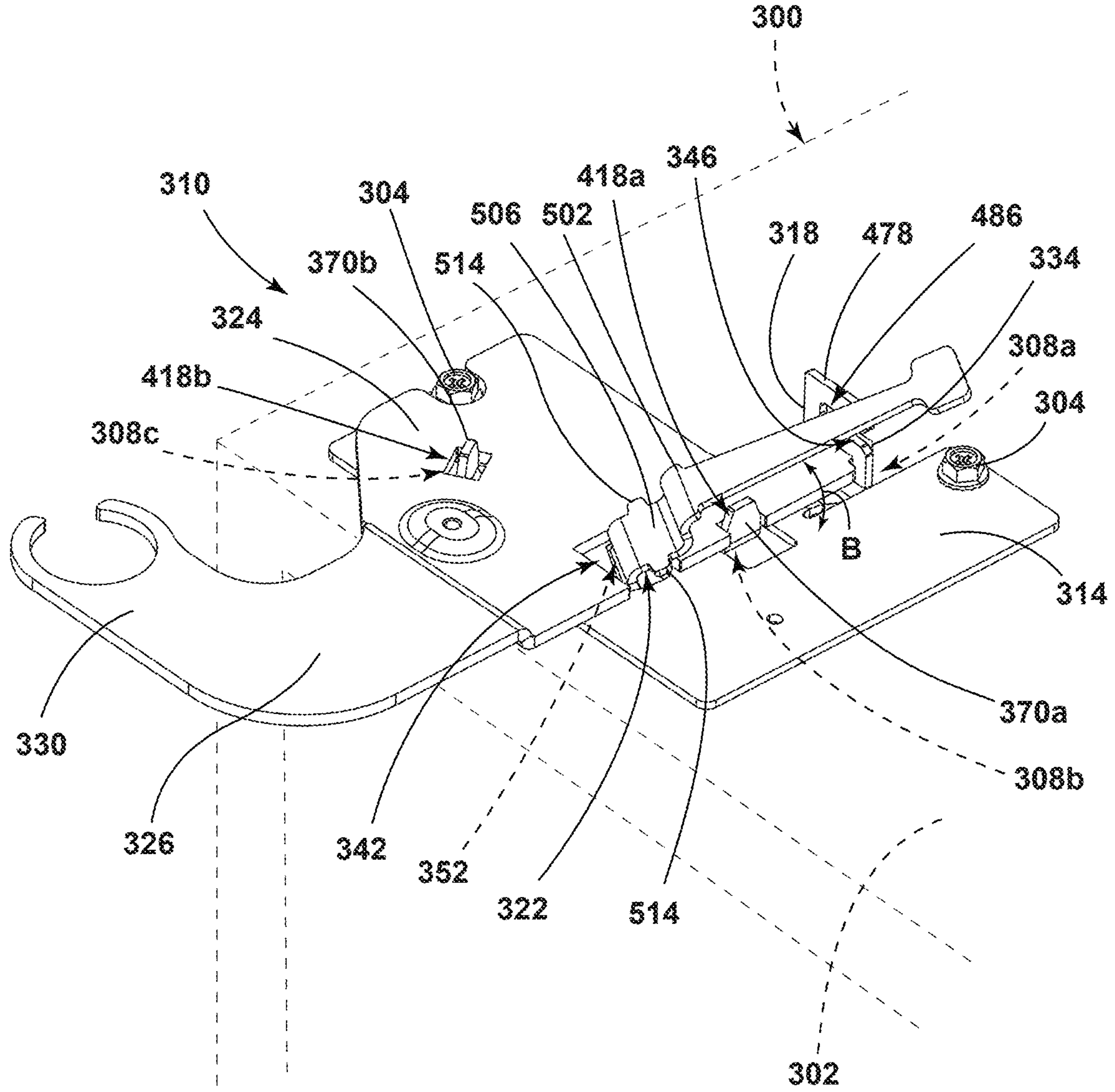
FIG. 18 is a top perspective view of the hinge plate and anchor plate of FIG. 17 with a locking arm in a disengaged position.
Figure 19A:
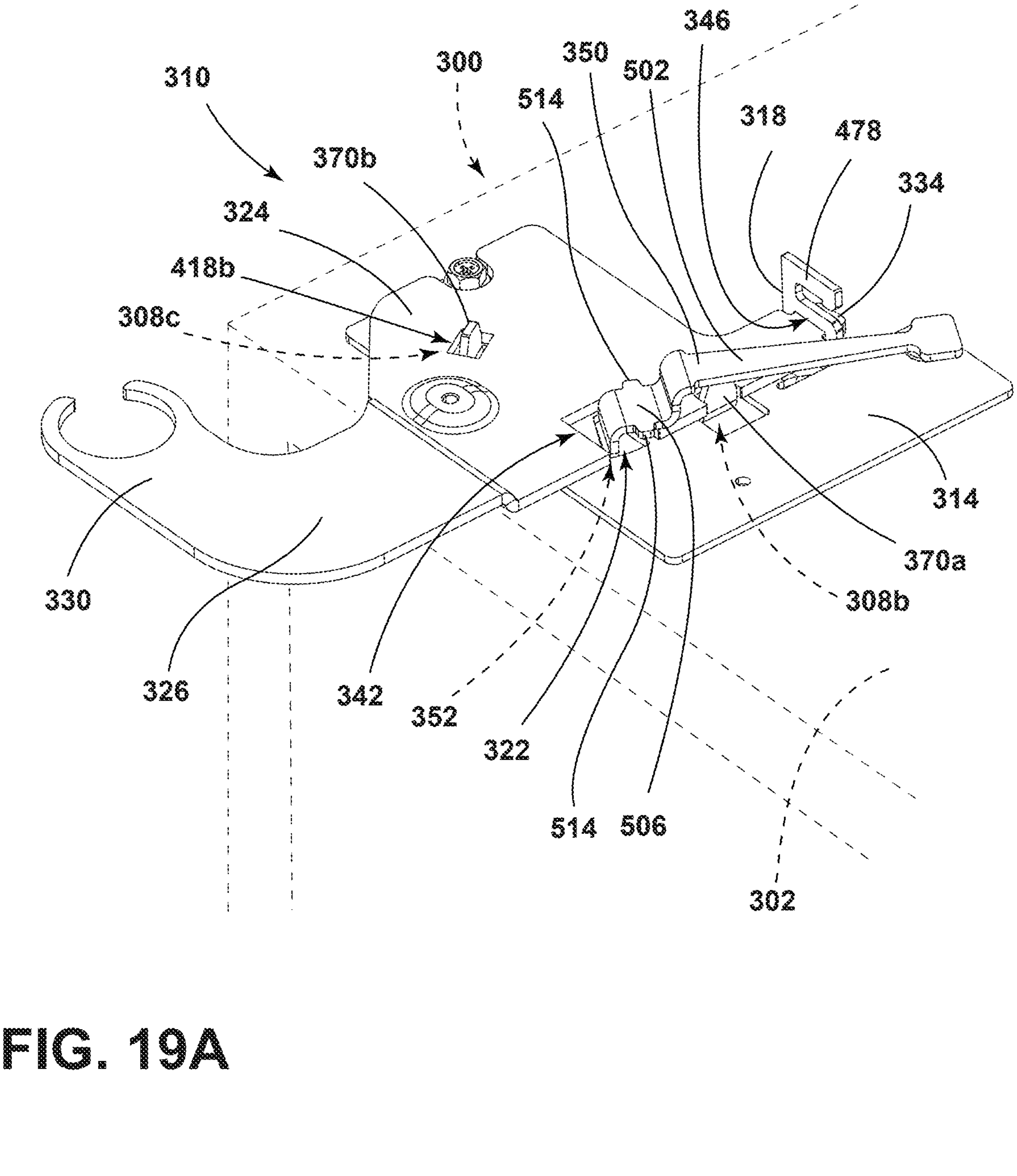
FIG. 19A is a top perspective view of the hinge plate and anchor plate of FIG. 17 with a locking arm in a partially engaged position.
Figure 19B:
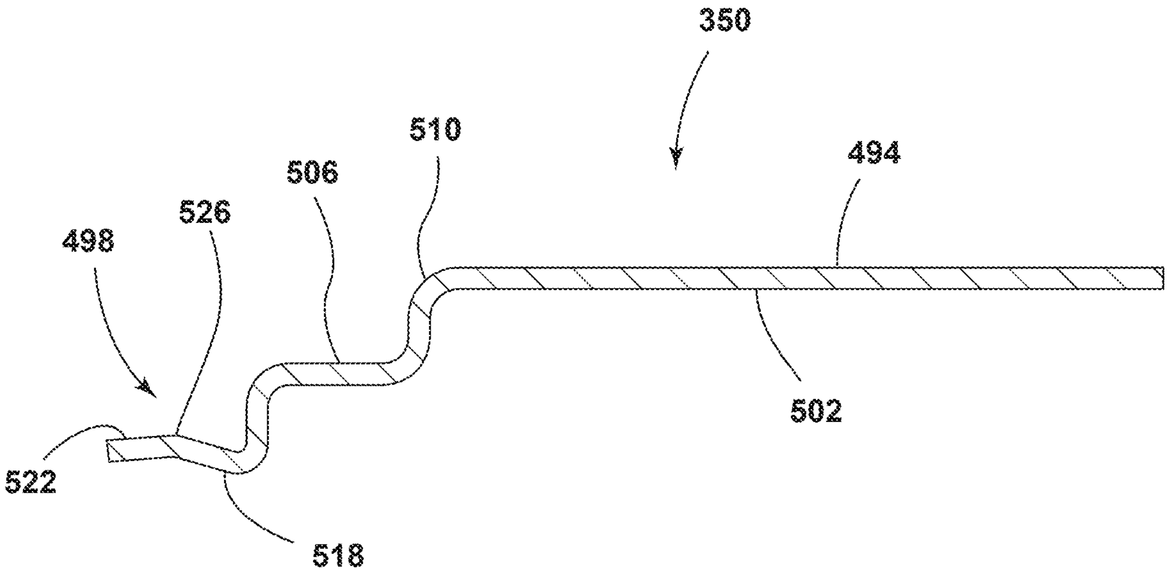
FIG. 19B is a cross-sectional view of the locking arm of FIG. 19A.
Figure 20:
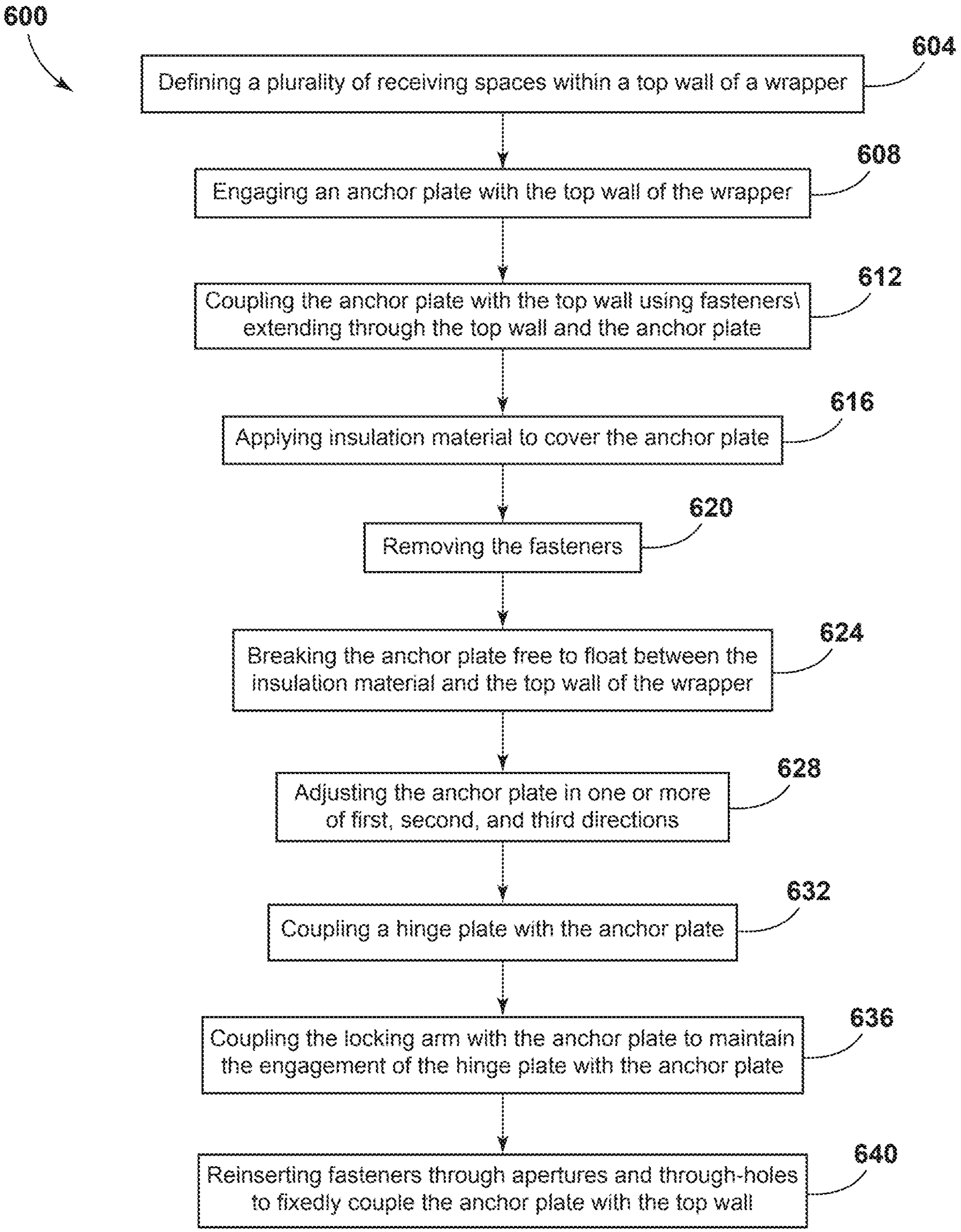
FIG. 20 is a flow diagram of a method for manufacturing an appliance, according to various examples.

Referring now to FIGS. 18-19B, the locking arm 350 may be movable between the locked position (FIG. 14B) and the unlocked position (FIG. 19A). The locking arm 350 may include a body 494 and a nose 498 extending from the body 494. The body 494 of the locking arm 350 may include an upper portion 502 and a lower portion 506 continuously formed and spaced apart by a step 510. The locking arm 350 is configured to engage with both the anchor plate 314 and the hinge plate 326 in the locked position.

The lower portion 506 may further include one or more fins 514 extending perpendicular to the upper portion 502 and the lower portion 506. The fins 514 may further be co-planar with the lower portion 506 of the locking arm 350. The fins 514 may be positioned as a pair of opposing fins 514 extending from the lower portion 506 and may be substantially flush with the upper surface 90 of the hinge plate 326 when the locking arm 350 is in the locked position.

The nose 498 may extend from a side of the lower portion 506 of the locking arm 350 opposite the upper portion 502 of the locking arm 350. The nose 498 may include a base portion 518 and an angular portion 522 joined at a vertex. The base portion 518 may extend from the lower portion 506 at a predetermined angle relative to the lower portion 506. Likewise, the angular portion 522 may extend from the lower portion 506 at a predetermined angle to define the vertex. The angular portion 522 may further have a wedge-shape culminating in a point.

A raised surface 526 may be positioned at the vertex between the base portion 518 and the angular portion 522. The raised surface 526 may be generally rounded and may be configured to abut a lower surface of the anchor plate 314 when the locking arm 350 is in the locked position, as described in more detail below.

As shown in FIG. 14B, the upper portion 502 may be configured to be received by, or engaged with, the retention space 478 of the retention member 318 when the locking arm 350 is in the locked position. The lower portion 506 may be substantially flush, or in contact, with the hinge plate 326 when the locking arm 350 is in the locked position. With reference to FIGS. 14B and 15, the height of the retention member 318 and the positioning of the retention space 478 may be determined by the spacing of the upper and lower portions 502, 506 of the locking arm 350 as spaced apart by the step 510. In other words, the distance between an upper surface of the hinge plate 326 and the retention space 478 may be substantially equivalent to the height of the step 510 of the body 494 of the locking arm 350.

Referring now to FIGS. 14A-20, a method 600 of manufacturing an appliance 12 is illustrated. The method 600 includes a step 604 of defining a plurality of receiving spaces 308*a*, 308*b*, 308*c* within a top wall 302 of a wrapper 300. Each of the plurality of receiving spaces 308*a*, 308*b*, 308*c* are configured to receive a retention member 318 and first and second flanges 370*a*, 370*b* of an anchor plate 314, respectively, and are defined to be oversized relative to the retention member 318 and the first and second flanges 370*a*, 370*b* of the anchor plate 314.

Another step 608 includes engaging the anchor plate 314 with the top wall 302 of the wrapper 300. Referring now to FIG. 16, in assembly, the anchor plate 314 is positioned engaged with the top wall 302 of the wrapper 300. When the anchor plate 314 is engaged with the top wall 302, the retention member 318 is received by the first receiving space 308*a*. The first receiving space 308*a* is sized to allow movement of the retention member 318 in a first direction parallel to a front of the appliance 12, as indicated by arrows X. The first flange 370*a* is received by the second receiving space 308*b*. The second receiving space 308*b* is sized to allow movement of the first flange 370*a* in a second direction perpendicular to the first direction, as indicated by arrows Y. The second flange 370*b* is received by the third receiving space 308*c*. The third receiving space 308*c* is sized to allow rotational movement of the second flange 370*b* in a third rotational direction, as indicated by arrows Z. The first locking aperture 322 is aligned with a third locking aperture 352 defined by the top wall 300 of the wrapper 302. The method 600 further includes a step 612 of coupling the anchor plate 314 with the top wall 302 using fasteners 304 extending through the top wall 302 and the anchor plate 314.

When the anchor plate 314 is coupled with the top wall 302, the anchor plate 314 is fixed. Insulation material 614 is applied to cover the anchor plate 314 (step 616). The fasteners 304 may then be removed (step 620) and the anchor plate 314 may be broken free to float between the insulation material 614 and the top wall 302 of the wrapper 300 (step 624). Another step 628 of the method 600 includes adjusting the anchor plate 314 in the first, second, and third directions (e.g., along arrows X, Y, and Z). This can be done before or after the hinge plate 326 is coupled with the anchor plate 314 (step 632). When the hinge plate 326 is coupled with the anchor plate 314, the hinge plate 326 is aligned with the anchor plate 314 and the protrusion 334 of the hinge plate 326 is received by the slot 346 of the retention member 318, the first and second locking apertures 322, 342 are aligned with the third locking aperture 352. The step 628 of adjusting the anchor plate 314 may include aligning the hinge plate 326 to position the door 24 relative to the cabinet 16 of the appliance 12.

A next step 636 of the method 600 includes inserting the locking arm 350 into the first, second, and third locking apertures 322, 342, 352 and coupling the locking arm 350 with the anchor plate 314 to maintain the engagement of the hinge plate 326 with the anchor plate 314. In other words, the locking arm 350 may be oriented in a first position, or an upright position. The nose 498 of the locking arm 350 may be received by the first and second locking apertures 322, 342 until one or both of the fins 514 of the lower portion 506 abut the hinge plate 326, as shown in FIG. 18. The locking arm 350 may then be rotated along arrow B such that the upper portion 502 of the body 494 of the locking arm 350 is substantially parallel with the hinge plate 326 (FIG. 19A). In other words, the locking arm 350 may be rotated from the first position into a second position, or the unlocked position.

The slot 346 may be defined by the retention member 318 such that the protrusion 334 is secured against vertical displacement with little or no deflection, as discussed elsewhere herein. The nose 498 may be at least partially received by the locking apertures 322, 342, 352 when the locking arm 350 is in the locked position to couple the hinge plate 326 with the anchor plate 314 with the top wall 302 of the wrapper 300 positioned therebetween. In the locked position, the locking arm 350 may then be rotated along arrow C into the retention space 474 of the retention member 318. The upper portion 502 of the body 494 of the locking arm 350 may be depressed along arrow D to allow the locking arm 350 to pass the lip 486 of the projection 474 of the retention member 318 so that the upper portion 502 may be received by the retention space 474. The lip 486 may then act as a stop to prevent inadvertent release of the locking arm 350 from the locked position, or third position.

The raised surface 526 may be configured to abut and apply a clamping force to the anchor plate 314 to leverage the anchor plate 314 upward toward the hinge plate 326 when the locking arm 350 is in the locked position. Likewise, the fins 514 of the lower portion 506 may be configured to apply the clamping force to the hinge plate 326 to couple the anchor plate 314 with the hinge plate 326 when the locking arm 350 is in the locked position, as discussed in more detail elsewhere herein. After the locking arm 350 is in the locked position, the fasteners 304 may be reinserted through one of a plurality of apertures 306 defined by the top wall 302 and one of a plurality of through-holes 360 defined by the anchor plate 314 to fixedly couple the anchor plate 314 with the top wall 302 of the wrapper 300 (step 640).

Referring again to FIGS. 1A-20, the use of the locking arm 50, 350 allows for a faster installation of the hinge plate 26, 326 with the appliance 12. The hinge plate 26, 326 may be aligned with the anchor plate 14, 314 using the raised visible guides (e.g., the retention member 18, 318, and/or the plurality of flanges 70, 370*a*, 370*b*). The locking arm 50, 350 may then be easily inserted into the first and second receiving apertures 22, 42 or first and second locking apertures 322, 342 of the anchor plate 14, 314 and the hinge plate 26, 326, to couple the hinge plate 26, 326 with the anchor plate 14, 314 without requiring screws or other fasteners that may not be easily removable. The locking arm 50, 350 is movable between the locked and unlocked position by a user, allowing for easier and more efficient coupling and release of the hinge plate 26, 326 and the anchor plate 14, 314. The door 24 may then be installed on the appliance 12 without extensive assembly of the hinge bracket assembly 10, 310.

According to one aspect of the disclosure, a hinge bracket assembly includes a hinge bracket assembly includes an appliance wrapper defining a first receiving space extending in a first direction, a second receiving space extending in a second direction substantially perpendicular to the first direction, and a third receiving space extending in a third direction oriented at an acute angle relative to the first direction. An anchor plate is engaged with the appliance wrapper and includes a retention member received by the first receiving space, a first flange received by the second receiving space, and a second flange received by the third receiving space. A hinge plate is coupled with the anchor plate and includes a protrusion received by a slot defined by the retention member. The appliance wrapper is positioned between the anchor and hinge plates. A locking arm is selectively engaged with the anchor and hinge plates and is rotatable between an unlocked position and a locked position.

According to another aspect of the disclosure, a first receiving space is oversized and configured to allow movement of a retention member in a first direction, a second receiving space is oversized and configured to allow movement of a first flange in a second direction, and a third receiving space is oversized and configured to allow movement of a second flange in a third direction.

According to another aspect of the disclosure, a third direction is oriented at an acute angle relative to a first direction and the acute angle is about 60 degrees.

According to another aspect of the disclosure, an anchor plate defines a first locking aperture, a hinge plate defines a second locking aperture, and a top wall defines a third locking aperture. The first, second, and third locking apertures are vertically aligned and configured to at least partially receive a locking arm.

According to another aspect of the disclosure, a first locking aperture is at least partially defined by an angled edge.

According to another aspect of the disclosure, a locking arm includes a body including an upper portion and a lower portion and a nose extending from the lower portion. The nose is received by first, second, and third locking apertures, and the upper portion is engaged with a retention member when the locking arm is in a locked position.

According to another aspect of the disclosure, a hinge bracket assembly includes a plurality of fasteners extending through a plurality of apertures defined by an appliance wrapper and a corresponding plurality of through-holes defined by an anchor plate.

According to another aspect of the disclosure, a hinge bracket assembly includes an insulation material coupled with an appliance wrapper. An anchor plate is positioned between the appliance wrapper and the insulation material.

According to another aspect of the disclosure, a method of manufacturing an appliance includes a step of defining first, second, and third receiving spaces within a top wall of an appliance wrapper. The method further includes steps of positioning a retention member of an anchor plate within the first receiving space, positioning a first flange of the anchor plate within the second receiving space, and positioning a second flange of the anchor plate within the third receiving space. Another step includes inserting a fastener through an aperture defined by the top wall and through a through-hole defined by the anchor plate. The method further includes steps of coupling an insulation material with the wrapper to at least partially cover the anchor plate and removing the fastener from at least one of the aperture and the through-hole. Another step includes adjusting the anchor plate so that the anchor plate is free to float between the insulation material and the top wall of the wrapper as allowed by the first, second, and third receiving spaces. The method also includes a step of adjusting the anchor plate in one of first, second, and third directions to reach a design position, wherein the second direction is substantially perpendicular to the first direction and the third direction is oriented diagonally relative to each of the first and second directions. Another step includes reinserting the fastener to couple the anchor plate in the design position.

According to another aspect of the disclosure, a method of manufacturing an appliance includes defining first, second, and third receiving spaces to be oversized relative to a retention member and first and second flanges of an anchor plate.

According to another aspect of the disclosure, a method of manufacturing an appliance includes defining a first receiving space to allow a first degree of movement of a retention member in a first direction, defining a second receiving space to allow a second degree of movement of a first flange in a second direction, and defining a third receiving space to allow a third degree of movement of a second flange in a third direction.

According to another aspect of the disclosure, a method of manufacturing an appliance includes coupling a hinge plate with an anchor plate and coupling a locking arm with the anchor plate and the hinge plate.

According to another aspect of the disclosure, a method of manufacturing an appliance includes inserting a protrusion of a hinge plate within a space defined by a retention member of an anchor plate.

According to another aspect of the disclosure, a method of manufacturing an appliance includes positioning a wrapper between a hinge plate and an anchor plate.

According to another aspect of the disclosure, a method of manufacturing an appliance includes inserting a locking arm through a first locking aperture defined by an anchor plate, inserting the locking arm through a second locking aperture defined by a hinge plate, and inserting the locking arm through a third locking aperture defined by a top wall of a wrapper.

According to another aspect of the disclosure, a method of manufacturing an appliance includes steps of defining at least one receiving space within a top wall of an appliance wrapper and engaging a flange of the anchor plate with the at least one receiving space. Another step includes coupling a hinge plate with the anchor plate. The method also includes adjusting the anchor plate within the at least one receiving space until the hinge plate aligns a door with an appliance cabinet. Other steps of the method include inserting the locking arm through a first aperture defined by the anchor plate, inserting the locking arm through a second aperture defined by the hinge plate, and inserting the locking arm through a third aperture defined by the top wall of the wrapper. Another step includes coupling the locking arm with the anchor plate and the hinge plate, wherein the locking arm couples the hinge plate with the anchor plate.

According to another aspect of the disclosure, a method of manufacturing an appliance includes defining a first receiving space extending in a first direction, defining a second receiving space extending in a second direction, wherein the second direction is substantially perpendicular to the first direction, and defining a third receiving space extending in a third direction.

According to another aspect of the disclosure, a method of manufacturing an appliance includes orienting a third direction to define an angle relative to a first direction, and further wherein the angle is about 60 degrees.

According to another aspect of the disclosure, a method of manufacturing an appliance includes defining a first receiving space to allow a first degree of movement of an anchor plate in a first direction, defining a second receiving space to allow a second degree of movement of the anchor plate in a second direction, and defining a third receiving space to allow a third degree of movement of the anchor plate in a third direction.

According to another aspect of the disclosure, a method of manufacturing an appliance includes inserting a fastener to fixedly couple an anchor plate to a top wall of a wrapper.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A hinge bracket assembly comprising:

an anchor plate engaged with a wall of an appliance wrapper and including a retention member, a first flange, and a second flange, wherein the retention member, the first flange and the second flange are each engaged with respective spaces of the wall of the appliance wrapper, wherein the retention member includes a body portion and an arm, and wherein a retention space is at least partially defined within the arm;

a hinge plate coupled with the anchor plate and including a protrusion received by a slot that is at least partially defined within the arm of the retention member of the anchor plate, wherein the appliance wrapper is positioned between the anchor plate and the hinge plate, and wherein the hinge plate receives the first flange and the second flange when coupled to the anchor plate; and a locking arm selectively engaged with the anchor plate and the hinge plate and rotatable between an unlocked position and a locked position, wherein the locking arm is a unitary structure and includes:

a body that opposes a nose, the nose and the body being separated by a step, wherein the locked position of the locking arm is characterized by the body received within the retention space of the retention member and the nose extending through each of the anchor plate, the wall of the appliance, and the hinge plate.

2. The hinge bracket assembly of claim 1, wherein the retention member, the first flange, and the second flange extend perpendicularly from the anchor plate, and wherein the first flange is positioned perpendicular with respect to the retention member.

3. The hinge bracket assembly of claim 1, wherein the anchor plate defines a first receiving aperture, the hinge plate defines a second receiving aperture, and the appliance wrapper defines a third receiving aperture, and further wherein the first, second, and third receiving apertures are vertically aligned and configured to at least partially receive the nose of the locking arm in the locked position.

4. The hinge bracket assembly of claim 3, wherein the nose is rotationally operable within the first receiving aperture, the second receiving aperture, and the third receiving aperture between the locked position and the unlocked position.

5. The hinge bracket assembly of claim 1, wherein the anchor plate is positioned between the appliance wrapper and an insulation material of the appliance wrapper.

6. The hinge bracket assembly of claim 1, wherein the hinge plate defines a first opening and a notch, and wherein the first opening receives the first flange of the anchor plate and the notch receives the second flange of the anchor plate.

7. The hinge bracket assembly of claim 1, wherein the hinge plate includes a hinge arm that extends from the hinge plate in a direction opposite of the protrusion.

8. The hinge bracket assembly of claim 4, wherein the locking arm includes at least one fin that is positioned between the body and the nose of the locking arm, wherein the at least one fin abuts an upper surface of the hinge plate when the locking arm is in the locked position.

9. A hinge bracket assembly comprising:

an anchor plate engaged with an appliance wrapper, the anchor plate including a retention member and a plurality of flanges, wherein the retention member and the plurality of flanges are received by respective spaces defined within a wall of the appliance wrapper, and wherein the retention member includes an arm that at least partially defines a retention space;

a hinge plate coupled with the anchor plate and including a protrusion received by a slot defined by the arm of the retention member, wherein the appliance wrapper is positioned between the anchor plate and the hinge plate; and a locking arm selectively engaged with the anchor plate and the hinge plate and rotatable between an unlocked position and a locked position, wherein the locking arm includes:

a body, a step, and a nose, wherein the body and the nose are in opposition and extend outward from the step, wherein the locked position is characterized by the body received within the retention space and the nose extending through the hinge plate, the wall of the appliance wrapper, and the anchor plate.

10. The hinge bracket assembly of claim 9, wherein the plurality of flanges includes a first flange and a second flange, wherein the first flange is positioned perpendicular with respect to the retention member.

11. The hinge bracket assembly of claim 9, wherein the anchor plate defines a first receiving aperture, the hinge plate defines a second receiving aperture, and the appliance wrapper defines a third receiving aperture, and further wherein the first, second, and third receiving apertures are vertically aligned and configured to at least partially receive the nose of the locking arm in the locked position.

12. The hinge bracket assembly of claim 10, wherein the anchor plate is positioned between the appliance wrapper and an insulation material of the appliance wrapper.

13. The hinge bracket assembly of claim 11, wherein the locking arm includes at least one fin that is positioned between the body and the nose of the locking arm, wherein the at least one fin abuts an upper surface of the hinge plate when the locking arm is in the locked position.

14. A hinge bracket assembly comprising:

an anchor plate engaged with an appliance wrapper, wherein the anchor plate includes a perpendicular retention member that defines a retention space therein, and a plurality of flanges, wherein the perpendicular retention member and the plurality of flanges are received by respective receiving spaces of the appliance wrapper;

a hinge plate coupled with the anchor plate and including a protrusion received by a slot defined within the perpendicular retention member of the anchor plate, wherein the appliance wrapper is positioned between the anchor plate and the hinge plate; and a locking arm selectively engaged with the anchor plate and the hinge plate and rotatable between an unlocked position and a locked position, wherein the locking arm is a unitary structure and includes a body that engages the perpendicular retention member, at least one fin that engages an upper surface of the hinge plate, and a nose that engages a lower surface of the anchor plate, wherein the at least one fin is positioned between the nose and the body;

in the locked position, the nose extends through each of the hinge plate, the appliance wrapper and the anchor plate;

in the locked position, the nose and the at least one fin are configured to apply a clamping pressure to the upper surface of the hinge plate and the lower surface of the anchor plate; and the clamping pressure is generated through engagement between the body of the locking arm and the retention space of the perpendicular retention member in the locked position.

15. The hinge bracket assembly of claim 14, wherein the anchor plate defines a first receiving aperture, the hinge plate defines a second receiving aperture, and the appliance wrapper defines a third receiving aperture, and further wherein the first, second, and third receiving apertures are vertically aligned and configured to at least partially receive the nose of the locking arm in the locked position.

* * * * *